(12) United States Patent
Berger et al.

(10) Patent No.: US 10,735,163 B2
(45) Date of Patent: Aug. 4, 2020

(54) SECURE RANGING MEASUREMENT

(71) Applicant: Marvell World Trade Ltd., St. Michael (BB)

(72) Inventors: Christian R. Berger, San Jose, CA (US); Sudhir Srinivasa, Los Gatos, CA (US); Liwen Chu, San Ramon, CA (US); Niranjan Grandhe, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/262,639

(22) Filed: Jan. 30, 2019

(65) Prior Publication Data

US 2019/0254113 A1 Aug. 15, 2019

Related U.S. Application Data

(60) Provisional application No. 62/629,590, filed on Feb. 12, 2018.

(51) Int. Cl.
*H04L 5/00* (2006.01)
*H04W 92/10* (2009.01)
(Continued)

(52) U.S. Cl.
CPC ......... *H04L 5/0048* (2013.01); *H04B 7/0452* (2013.01); *H04B 17/27* (2015.01);
(Continued)

(58) Field of Classification Search
CPC ..... G01S 5/0009–145; G01S 11/02–10; H04B 7/02–0495; H04B 17/0082–409;
(Continued)

(56) References Cited

U.S. PATENT DOCUMENTS

2005/0026563 A1 2/2005 Leeper et al.
2014/0348097 A1 11/2014 Park et al.
(Continued)

FOREIGN PATENT DOCUMENTS

EP 2178240 A2 4/2010
WO WO-2014/130070 8/2014

OTHER PUBLICATIONS

International Search Report and Written Opinion in International Patent Application No. PCT/US2019/015908, dated May 7, 2019 (15 pages).

(Continued)

*Primary Examiner* — Timothy J Weidner

(57) ABSTRACT

In a range measurement signal exchange session between a first communication device and a second communication device, the first communication device generates an NDP, which includes: generating a plurality of training fields to be used by the second communication device to determine a time of arrival of the NDP. Each training field corresponds to a respective orthogonal frequency divisional multiplexing (OFDM) symbol. Generating the plurality of training fields includes: i) setting signal samples corresponding to guard intervals between the OFDM symbols to zero, and ii) for each OFDM symbol, setting a plurality of frequency domain values corresponding to OFDM sub carriers of the OFDM symbol to complex number values. The first communication device transmits the NDP as part of the range measurement signal exchange session.

28 Claims, 12 Drawing Sheets

(51) Int. Cl.

| | |
|---|---|
| *H04W 88/08* | (2009.01) |
| *H04W 88/02* | (2009.01) |
| *H04W 84/12* | (2009.01) |
| *H04W 74/00* | (2009.01) |
| *H04W 72/04* | (2009.01) |
| *H04W 56/00* | (2009.01) |
| *H04W 24/10* | (2009.01) |
| *H04W 12/00* | (2009.01) |
| *H04L 27/26* | (2006.01) |
| *H04L 1/00* | (2006.01) |
| *H04B 17/27* | (2015.01) |
| *H04B 7/0452* | (2017.01) |
| *G01S 11/08* | (2006.01) |
| *G01S 5/14* | (2006.01) |
| *G01S 5/12* | (2006.01) |

(52) U.S. Cl.
CPC .......... *H04L 1/0061* (2013.01); *H04L 5/0007* (2013.01); *H04L 27/2605* (2013.01); *H04L 27/2607* (2013.01); *H04L 27/2613* (2013.01); *H04L 27/2627* (2013.01); *H04W 12/0017* (2019.01); *H04W 24/10* (2013.01); *H04W 56/003* (2013.01); *H04W 72/042* (2013.01); *H04W 72/0453* (2013.01); *H04W 74/006* (2013.01); *G01S 5/12* (2013.01); *G01S 5/14* (2013.01); *G01S 11/08* (2013.01); *H04W 84/12* (2013.01); *H04W 88/02* (2013.01); *H04W 88/08* (2013.01); *H04W 92/10* (2013.01)

(58) Field of Classification Search
CPC . H04J 11/0023–0093; H04J 2011/0003–0096; H04L 1/004–0693; H04L 5/0001–26; H04L 27/26–30; H04W 12/00–0017; H04W 12/005–00503; H04W 24/02–10; H04W 56/0005–0095; H04W 64/00–006; H04W 72/005–14; H04W 74/002–0891; H04W 80/02; H04W 84/02; H04W 84/10; H04W 84/12; H04W 88/02–10; H04W 92/10

See application file for complete search history.

(56) References Cited

U.S. PATENT DOCUMENTS

| | | |
|---|---|---|
| 2016/0323879 A1 | 11/2016 | Ghosh et al. |
| 2017/0257900 A1 | 9/2017 | Qi et al. |
| 2018/0027561 A1 | 1/2018 | Segev et al. |
| 2019/0045361 A1 | 2/2019 | Gurevitz et al. |

OTHER PUBLICATIONS

Lindskog et al., "CP Replay Attack Protection," IEEE Draft, doc IEEE 802.11-17/1372r1, Sep. 11, 2017 (26 pages).

Rafiee et al., "DNS Update Extension to IPv6 Secure Addressing," 2013 27th Int'l Conf. on Advanced Information Networking and Applications Workshops, pp. 896-902, Mar. 28, 2013.

IEEE Std 802.11-REVmc™/D8.0, Aug. 2016, "Draft Standard for Information technology—Telecommunications and information exchange between systems—Local and metropolitan area networks—Specific requirements Part 11: Wireless LAN Medium Access Control (MAC) and Physical Layer (PHY) Specifications," The Institute of Electrical and Electronics Engineers, Inc., pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

Lindskog et al., "CP Replay Attack Protection," IEEE draft 802.11-17/1372-r0, 26 slides (Sep. 11, 2017).

Xu et al., "CP-replay Threat Model for 11az," IEEE draft 802.11-17/1122r0, 15 slides (Jul. 11, 2017).

Xu et al., "Zero-Padded Waveform for Secure Channel Estimation," IEEE draft 802.11-17/1378r0, 12 slides (Sep. 11, 2017).

Zhu et al., "IEEE P802.11, Wireless LANs, Proposed 802.11az Functional Requirements," Institute of Electrical and Electronics Engineers, doc. IEEE 802.11-16/0424r4, 6 pages (Mar. 13, 2017).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

Generate an NDP for a range measurement signal exchange session with a second communication device, where the NDP includes a plurality of training fields corresponding to OFDM symbols, including:

i) setting signal samples corresponding to GIs between the OFDM symbols to zero, and Ii) for each OFDM symbol, setting a plurality of frequency domain values for OFDM subcarriers to complex number values

1004

↓

Transmit the NDP as part of the range measurement signal exchange session 1008

SECURE RANGING MEASUREMENT

CROSS REFERENCES TO RELATED APPLICATIONS

This application claims the benefit of U.S. Provisional Patent Apr. No. 62/629,590, entitled "Secure Long Training Field (LTF) Processing," filed on Feb. 12, 2018, the disclosure of which is hereby expressly incorporated herein by reference in its entirety.

FIELD OF TECHNOLOGY

The present disclosure relates generally to wireless communication systems, and more particularly to measuring distances between wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabytes per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the Gigabit per second (Gbps) range. Future standards (e.g., IEEE 802.11ax) promise to provide even greater throughput, such as throughput in the tens of Gbps range.

Some mobile communication devices include a WLAN network interface and satellite positioning technology, such as global positioning system (GPS) technology. GPS technology in mobile communication devices is useful for physically navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Additionally, sometimes a wireless communication device merely needs to know a distance from another wireless communication device, and GPS technology may not be available or using GPS technology will take too much time or consume too much power.

Techniques for determining a distance between communication devices using WLAN technology are now under development. For example, a distance between a first communication and a second communication device is determined by measuring a time of flight of WLAN transmissions between the first communication device and the second communication device, and the determined distance.

Similar techniques can be used to determine a position of a communication device, and are now under development. For example, after determining the distance between the first communication device and the second communication device, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method includes: generating, at a first communication device, a null data packet (NDP) for a range measurement signal exchange session between the first communication device and a second communication device. Generating the NDP includes: generating a plurality of training fields to be used by the second communication device to determine a time of arrival of the NDP. Each training field corresponds to a respective orthogonal frequency divisional multiplexing (OFDM) symbol. Generating the plurality of training fields includes: i) setting signal samples corresponding to guard intervals between the OFDM symbols to zero, and ii) for each OFDM symbol, setting a plurality of frequency domain values corresponding to OFDM sub carriers of the OFDM symbol to complex number values. The method further includes transmitting, by the first communication device, the NDP as part of the range measurement signal exchange session.

In another embodiment, an apparatus comprises: a network interface device associated with a first communication device. The network interface device includes one or more integrated circuits (ICS) configured to: generate an NDP for a range measurement signal exchange session between the first communication device and a second communication device. Generating the NDP includes: generating a plurality of training fields to be used by the second communication device to determine a time of arrival of the NDP, wherein each training field corresponds to a respective OFDM symbol. The one or more ICs are further configured to: i) set signal samples corresponding to guard intervals between the OFDM symbols to zero, and ii) for each OFDM symbol, set a plurality of frequency domain values corresponding to OFDM sub carriers of the OFDM symbol to complex number values. The one or more ICs are further configured to transmit the NDP as part of the range measurement signal exchange session.

In yet another embodiment, a method includes: receiving, at a first communication device, an indication of a sequence corresponding to a training field in an NDP in a range measurement exchange session with a second communication device, wherein the training field corresponds to an OFDM symbol, wherein the sequence specifies frequency domain values for the OFDM symbol, and wherein the sequence includes complex number values; determining, at the first communication device, a signal corresponding to the training field using the indication of the sequence that specifies the frequency domain values for the OFDM symbol corresponding to the training field; generating, at the first communication device, a cross-correlation between a received signal and the signal corresponding to the training field; detecting, at the first communication device, the training field in the received signal; and using, at the first communication device, the detection of the training field in the received signal to determine a time of arrival at the first communication device of the NDP.

In still another embodiment, an apparatus comprises: a network interface device associated with a first communication device. The network interface device includes one or more ICs configured to: receive an indication of a sequence corresponding to a training field in an NDP in a range measurement exchange session with a second communication device, wherein the training field corresponds to an OFDM symbol, wherein the sequence specifies frequency domain values for the OFDM symbol, and wherein the sequence includes complex number values, determine a signal corresponding to the training field using the indication of the sequence that specifies the frequency domain values for the OFDM symbol corresponding to the training field, generate a cross-correlation between a received signal and the signal corresponding to the training field, detect the training field in the received signal, and use the detection of the training field in the received signal to determine a time of arrival at the first communication device of the NDP.

BRIEF DESCRIPTION OF THE DRAWINGS

FIG. 10 is a flow diagram of an example method for generating an NDP for a ranging measurement signal exchange session between a first communication device and a second communication device, according to an embodiment.

DETAILED DESCRIPTION

Time of flight measurement techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, time of flight measurement techniques are utilized in other types of wireless communication systems such as personal area networks (PANs), mobile communication networks such as cellular networks, metropolitan area networks (MANs), satellite communication networks, etc.

As discussed in more detail below, a malicious actor with a wireless device (attacker) may attempt to trick a first communication device into mistakenly determining that a second communication device is closer than the second communication device is in reality. For example, when the second communication device transmits a packet to the first communication device as part of a ranging measurement, the attacker detects the packet and, during transmission of the packet, retransmits a portion of the packet with a time advance. The retransmission by the attacker may cause the first communication device to mistakenly determine that the second communication device is closer than the second communication device is in reality. Such a malicious action is sometimes referred to herein as a "replay attack". In various embodiments described below, a packet used in a ranging measurement is generated in a manner such that an attacker is unable to institute a replay attack, or at least a replay attack is made much more difficult.

Figure 1:
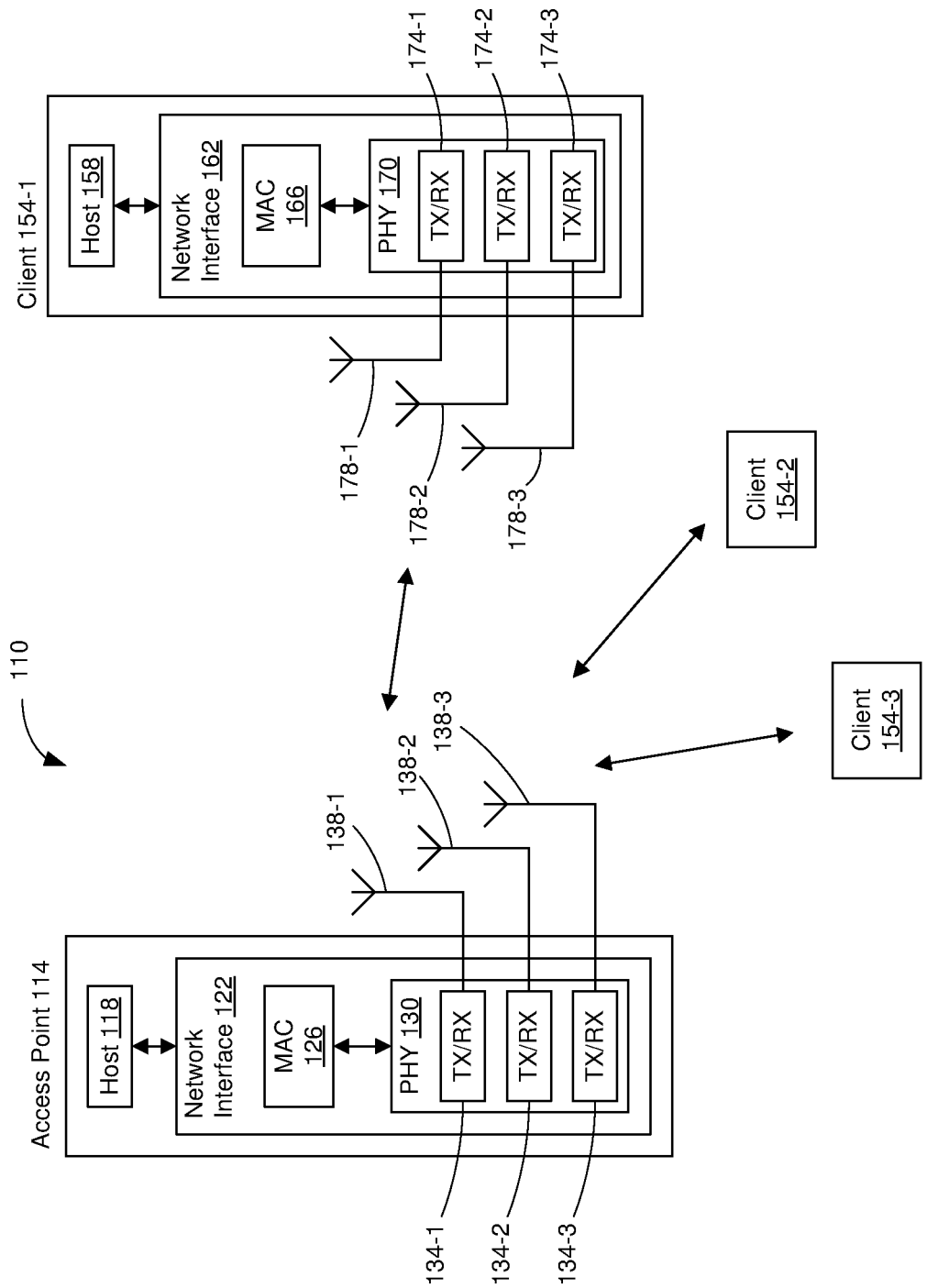
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICS) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHI functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHI processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 additionally or alternatively includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHI processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHI functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHI processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 additionally or alternatively includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

FIG. 2 is a diagram of an example PPDU 200 that the network interface 122 (FIG. 1) is configured to generate and transmit to a client station 154 (e.g., the client station 154-1), according to an embodiment. The network interface 162 (FIG. 1) may also be configured to transmit PPDUs the same as or similar to the PPDU 200 to the AP 114. The PPDU 200 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, for example, or other suitable bandwidths, in other embodiments.

The PPDU 200 includes a PHY preamble 202 including a legacy short training field (L-STF) 205, a legacy long training field (L-LT) 210, a legacy signal field (L-SIG) 215, a very high throughput (VHT) signal field (VHT-SIG-A) 220, a VHT short training field (VHT-STF) 225, M VHT long training fields (VHT-LTFs) 230, where M is a suitable positive integer, and a further VHT signal field (VHT-SIG-B) 234. In an embodiment, M generally corresponds to (e.g., is greater than or equal to) a number of spatial streams via which the PPDU 200 will be transmitted. A legacy preamble (L-preamble) 242 of the PHY preamble 202 includes the L-STF 205, L-LTF 210 and L-SIG 215. A VHT preamble portion 244 of the PHY preamble 202 includes the VHT-SIG-A 220, the VHT-STF 225, the M VHT-LTFs 230, and the VHT-SIG-B 234. The PPDU 200 also includes a PHY data portion 240. In some scenarios, the PPDU 200 omits the PHI data portion 240 (e.g., a null data packet (NDP)).

In an embodiment, the L-STF 205 includes a signal that is configured to permit a wireless receiver to perform one or more functions such as i) packet detection, ii) initial synchronization, and iii) AGC adjustment. In an embodiment, the L-LTF 210 includes a signal that is configured to permit the wireless receiver to perform one or more functions such as i) channel estimation and ii) fine synchronization. In an embodiment, the VHT-STF 225 includes a signal that is configured to permit the wireless receiver to perform a function such as AGC refinement. In an embodiment, the VHT-LTFs 230 include signals that are configured to permit the wireless receiver to perform a function such as channel estimation for a multiple input, multiple output (MIMO) channel that employs multiple spatial streams. The contents of the L-STF 205, the L-LTF 210, and the VHT-LTFs 230 are defined by the communication protocol and are the same for every packet.

The VHT-SIG-A 220 and the VHT-SIG-B 234 generally carry information about the format of the PHY data unit 200, such as information needed to properly decode at least a portion of the PHY data unit 200, in an embodiment. The VHT-SIG-A 220 carries information commonly needed by multiple intended receivers of the data unit 200. On the other hand, the VHT-SIG-B 234 carries user-specific information individually needed by each intended receiver of the data unit 200. In an embodiment, VHT-SIG-A 220 includes information such as a bandwidth of the data unit 200, a group identifier (ID) that indicates a particular set of intended receivers, etc. In an embodiment, at least when the data unit includes the data portion 240, the VHT-SIG-B 234 includes information that indicates respective data rates that are used in the PHY data portion 240 for respective intended receivers. For example, in an embodiment, the VHT-SIG-B 234 includes respective subfields that indicate respective modulation and coding schemes (MCSs) that are used in the PHY data portion 240 for respective intended receivers, at least when the data unit 200 includes the data portion 240. In an embodiment, the VHT-SIG-B 234 includes information that indicates which spatial streams correspond to which intended receivers.

In some embodiments, the PHY preamble 202 omits one or more of the fields 205-234. In some embodiments, the PHY preamble 202 includes additional fields not illustrated in FIG. 2A.

Each of the L-STF 205, the L-LTF 210, the L-SIG 215, the VHT-SIG-A 220, the VHT-SIG-B 234, the VHT-STF 225, and the M VHT-LTFs 230 comprises one or more orthogonal frequency division multiplexing (OFDM) symbols. As merely an illustrative example, the VHT-SIG-A 220 comprises two OFDM symbols.

Figure 2A:
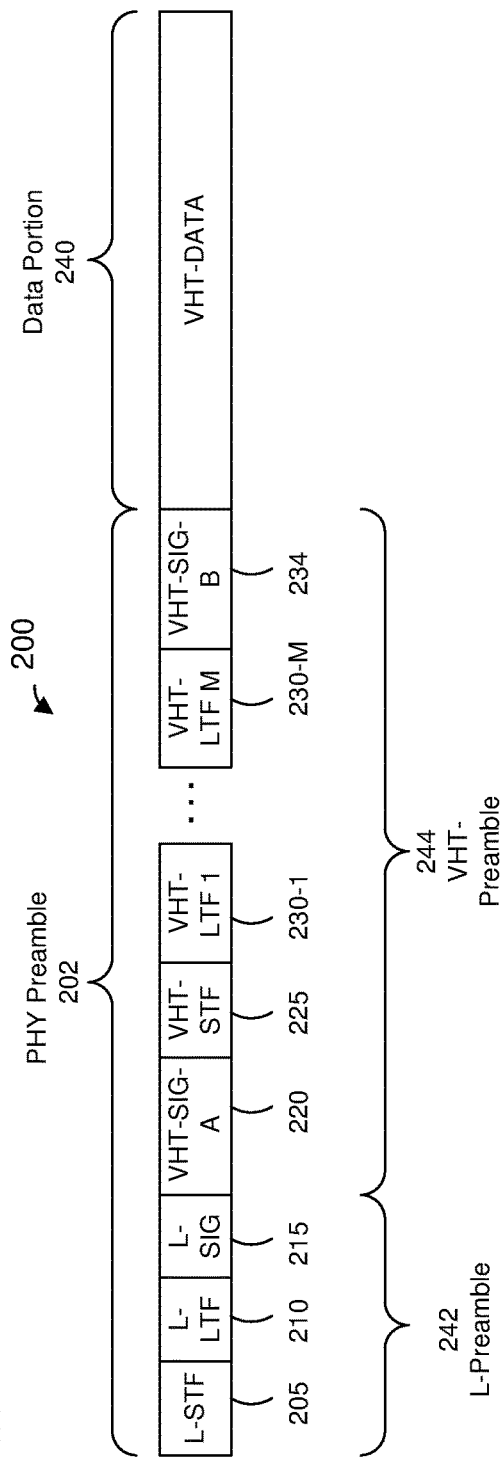
FIG. 2A is a diagram of an example physical layer (PHY) data unit, according to an embodiment.

In the illustration of FIG. 2A, the packet 200 includes one of each of the L-STF 205, the L-LTF 210, the L-SIG 215, the VHT-SIG-A 220, and the VHT-SIG-B 234. In some embodiments in which a packet similar to the packet 200 occupies a cumulative bandwidth other than 20 MHz, each of the L-STF 205, the L-LTF 210, the L-SIG 215, and the VHT-SIG-A 220 is repeated over a corresponding number of 20 MHz sub-bands of the whole bandwidth of the packet, in an embodiment. For example, in an embodiment in which the packet 200 occupies an 80 MHz bandwidth, the packet 200 includes four of each of the L-STF 205, the L-LTF 210, the L-SIG 215, and the VHT-SIG-A 220.

The PHY preamble 202 generally corresponds to a PHY preamble defined by the IEEE 802.11ac (VHT) Standard.

Figure 2B:
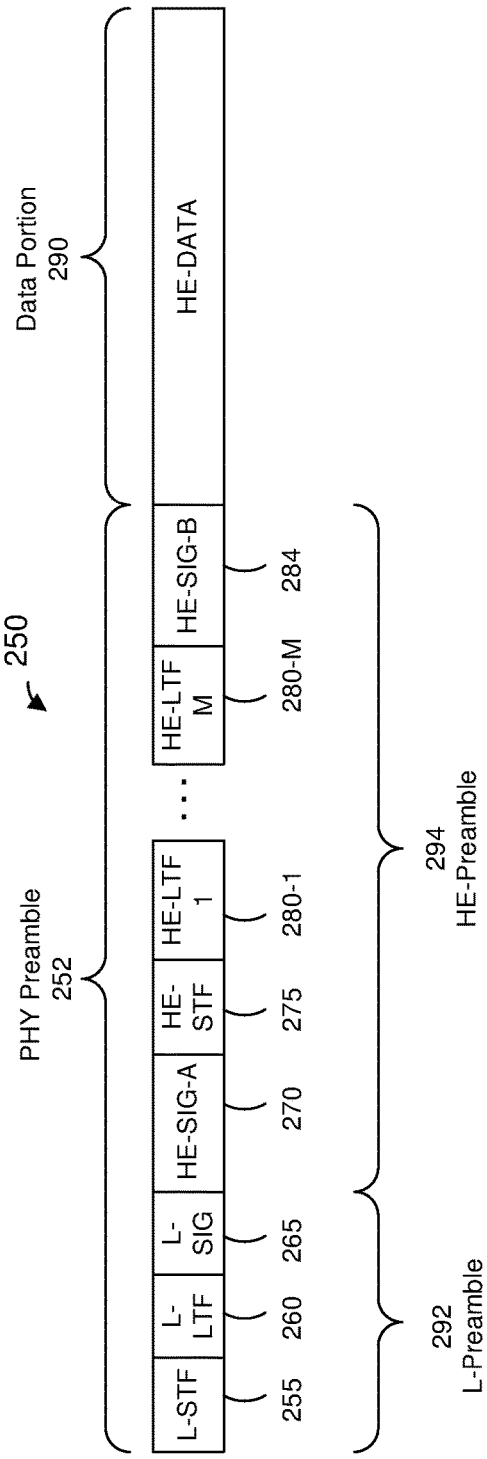
FIG. 2B is a diagram of another example PHY data unit, according to another embodiment.

FIG. 2B is a diagram of another example PPDU 250 that the network interface 122 (FIG. 1) is configured to generate and transmit to a client station 154 (e.g., the client station 154-1), according to another embodiment. The network interface 162 (FIG. 1) may also be configured to transmit PPDUs the same as or similar to the PPDU 250 to the AP 114. The PPDU 250 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, for example, or other suitable bandwidths, in other embodiments.

The PPDU 250 includes a PHY preamble 252 including an L-STF 255, an L-LT 260, an L-SIG 265, a high efficiency (HE) signal field (HE-SIG-A) 270, an HE-STF 275, M HE-LTFs 280, where M is a suitable positive integer, and a further HE signal field (HE-SIG-B) 284. In an embodiment, M generally corresponds to (e.g., is greater than or equal to) a number of spatial streams via which the PPDU 250 will be transmitted. A legacy preamble (L-preamble) 292 of the PHY preamble 252 includes the L-STF 255, L-LTF 260 and L-SIG 265. An HE preamble portion 294 of the PHI preamble 252 includes the HE-SIG-A 270, the HE-STF 275, the M HE-LTFs 280, and the HE-SIG-B 2834. The PPDU 250 also includes a PHY data portion 290. In some scenarios, the PPDU 250 omits the PHY data portion 290 (e.g., an NDP).

In an embodiment, the L-STF 255 is the same as or similar to the L-STF 205 (FIG. 2A). In an embodiment, the L-LTF 210 is the same as or similar to the L-LTF 210 (FIG. 2A). In an embodiment, the HE-STF 275 includes a signal that is configured to permit the wireless receiver to perform a function such as AGC refinement. In an embodiment, the HE-LTFs 280 include signals that are configured to permit the wireless receiver to perform a function such as channel estimation for a MIMO channel that employs multiple spatial streams. The contents of the L-STF 255, the L-LTF 260, and the HE-LTFs 280 are defined by the communication protocol and are the same for every packet.

The HE-SIG-A 270 and the HE-SIG-B 284 generally carry information about the format of the PHY data unit 250, such as information needed to properly decode at least a portion of the PHY data unit 250, in an embodiment. The HE-SIG-A 270 carries information commonly needed by multiple intended receivers of the data unit 270. On the other hand, the HE-SIG-B 284 carries user-specific information individually needed by each intended receiver of the data unit 250. In an embodiment, HE-SIG-A 270 includes information such as a bandwidth of the data unit 250, a group ID that indicates a particular set of intended receivers, etc. In an embodiment, at least when the data unit includes the data portion 290, the HE-SIG-B 284 includes information that indicates respective data rates that are used in the PHY data portion 290 for respective intended receivers. For example, in an embodiment, the HE-SIG-B 284 includes respective subfields that indicate respective MCSs that are used in the PHY data portion 290 for respective intended receivers, at least when the data unit 250 includes the data portion 290. In an embodiment, the HE-SIG-B 284 includes information that indicates which spatial streams correspond to which intended receivers.

In some embodiments, the PHY preamble 252 omits one or more of the fields 255-284. In some embodiments, the PHY preamble 252 includes additional fields not illustrated in FIG. 2B.

Each of the L-STF 255, the L-LTF 260, the L-SIG 265, the HE-SIG-A 270, the HE-SIG-B 284, the HE-STF 275, and the M HE-LTFs 280 comprises one or more OFDM symbols. As merely an illustrative example, the HE-SIG-A 270 comprises two OFDM symbols.

In the illustration of FIG. 2B, the packet 250 includes one of each of the L-STF 255, the L-LTF 260, the L-SIG 265, the HE-SIG-A 270, and the HE-SIG-B 284. In some embodiments in which a packet similar to the packet 250 occupies a cumulative bandwidth other than 20 MHz, each of the L-STF 255, the L-LTF 260, the L-SIG 265, and the VHT-SIG-A 270 is repeated over a corresponding number of 20 MHz sub-bands of the whole bandwidth of the packet, in an embodiment. For example, in an embodiment in which the packet 260 occupies an 80 MHz bandwidth, the packet 260 includes four of each of the L-STF 255, the L-LTF 260, the L-SIG 265, and the VHT-SIG-A 270.

The PHY preamble 252 generally corresponds to a PHY preamble defined by the IEEE 802.11ax (HE) Standard.

Although PHY data units defined by the IEEE 802.11ac (VHT) Standard and IEEE 802.11ax (HE) Standard are described above, in other embodiments, other suitable PHI preambles are utilized.

Figure 3A:
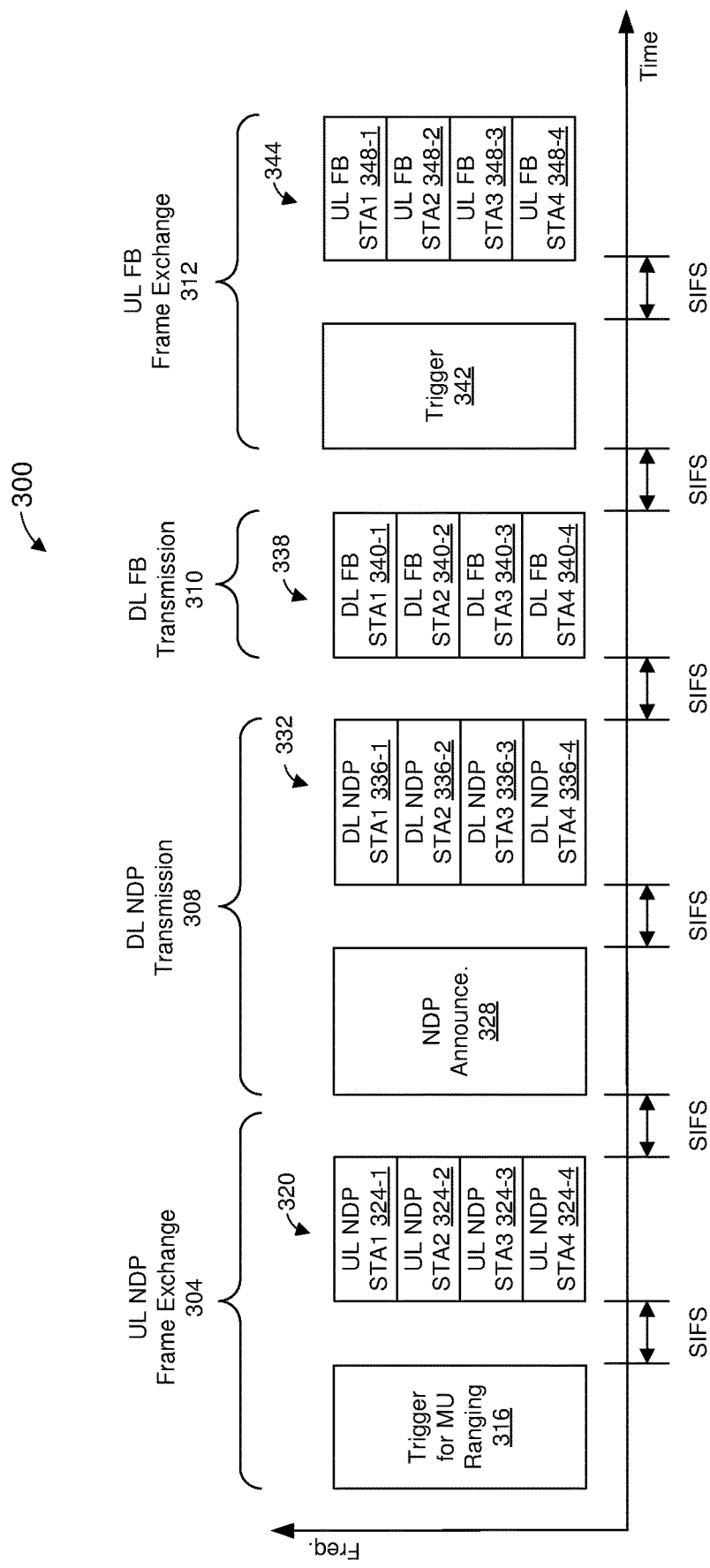
FIG. 3A is a diagram of an example multi-user (MU) ranging measurement exchange in an MU ranging measurement procedure, according to an embodiment.

FIG. 3A is a diagram of an example multi-user (MU) ranging measurement exchange 300 in an MU ranging measurement procedure, according to an embodiment. The diagram of FIG. 3A is described in the context of the example network 110 merely for explanatory purposes. In some embodiments, signals illustrated in FIG. 3A are generated by other suitable communication devices in other suitable types of wireless networks.

The MU ranging measurement exchange 300 corresponds to an AP-initiated ranging measurement exchange, according to an embodiment. The MU ranging measurement exchange 300 includes an uplink (UL) null data packet (NDP) frame exchange 304, a downlink (DL) NDP transmission portion 308, a DL feedback transmission 310, and an UL feedback frame exchange 312. The MU ranging measurement exchange 300 omits one of the DL feedback transmission 310 and the UL feedback frame exchange 312, in some embodiments.

In the UL NDP exchange 304, a first communication device (e.g., the AP 114) transmits a DL PPDU 316 that includes a trigger frame to prompt a group of multiple second communication devices (e.g., client stations 154) to simultaneously transmit, as part of an uplink (UL) MU transmission 320, UL null data packets (NDPs) 324. In an embodiment, the trigger frame in the PPDU 316 is a type of trigger frame specifically for initiating an MU ranging measurement exchange such as the MU ranging measurement exchange 200. The trigger frame in the PPDU 316 prompts multiple client stations 154 to begin simultaneously transmitting the UL MU transmission 320 a defined time period after an end of the PPDU 316. In an embodiment, the defined time period is a short interframe space (SIFS) as defined by the IEEE 802.11 Standard. In other embodiments, another suitable time period is utilized.

The UL MU transmission 320 (which may be an UL orthogonal frequency division multiple access (OFDMA) transmission or an UL MU multiple input, multiple output (MIMO) transmission) includes UL NDPs 324 from multiple client stations 154, e.g., STA1, STA2, STA3, and STA4. The UL NDPs 324 include PHY preambles having one or more short training fields (STFs), one or more long training fields (LTFs) and one or more signal fields, in an embodiment. The UL NDPs 324 omit data portions. The UL NDP packets 324 are illustrated in FIG. 3A as being transmitted in different frequency bandwidth portions. In another embodiment, the UL NDP packets 324 are transmitted using different spatial streams.

When transmitting the UL NDPs 324, each client station 154 records a time $t_{1,k}$ at which the client station 154 began transmitting a particular portion of the UL NDP 324 (e.g., an LT portion), where k is an index indicating the particular client station 154. Similarly, when the AP 114 receives each UL NDP 324, the AP 114 records a time $t_{2,k}$ at which the AP 114 began receiving the particular portion of the UL NDP 324 (e.g., the LT portion).

Figure 3B:
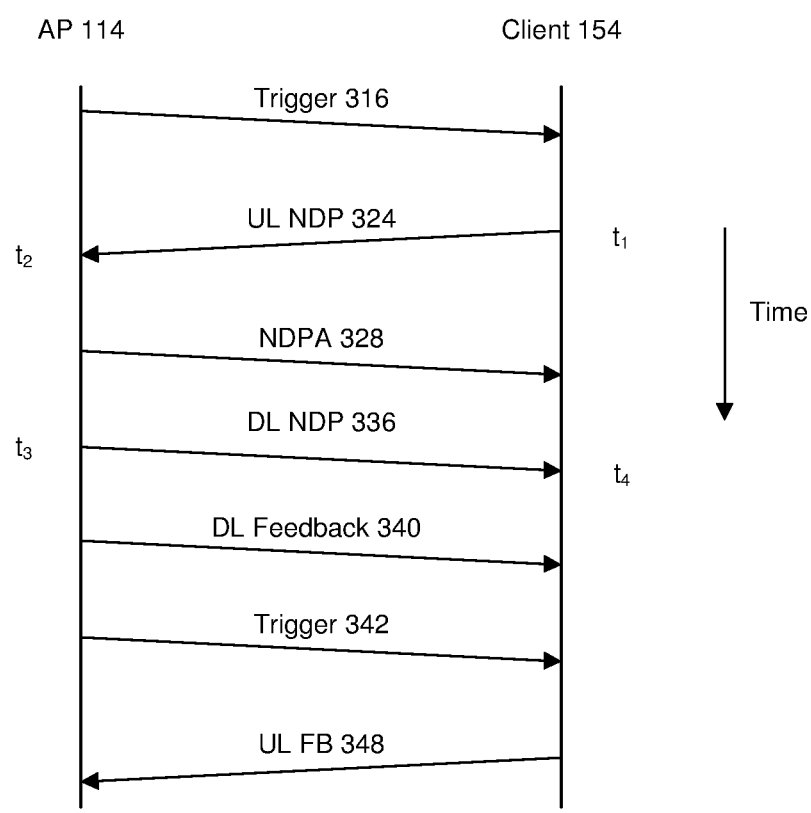
FIG. 3B is a timing diagram of the example MU ranging measurement exchange of FIG. 3A, according to an embodiment.

FIG. 3B is a timing diagram of the example MU ranging measurement exchange 300 of FIG. 3A. As illustrated in FIG. 3B, a client station 154 records the time ti at which the client station 154 began transmitting a particular portion of the UL NDP 324 (e.g., an LT portion). Additionally, the AP 114 records the time $t_2$ at which the AP 114 began receiving the particular portion of the UL NDP 324 (e.g., the LT portion).

Referring now to FIGS. 3A and 3B, responsive to the UL MU transmission 320, the AP 114 begins transmitting a DL PPDU 328 that includes an NDP announcement (NDPA) frame a defined time period after an end of the UL MU transmission 320. In an embodiment, the defined time period is SIFS. In other embodiments, another suitable time period is utilized. The NDPA frame in the PPDU 328 is configured to prompt the client stations 154 to be prepared to receive an NDP from the AP 114, according to an embodiment.

The AP 114 begins transmitting a DL MU transmission 332 a defined time period after an end of the DL PPDU 328. In an embodiment, the defined time period is SIFS. In other embodiments, another suitable time period is utilized. The DL MU transmission 332 includes DL NDPs 336 to respective client stations 154. In another embodiment, the AP 114 uses a SU DL transmission (with a broadcast address) to the client stations 154. The DL NDPs 336 include PHY preambles having one or more STFs, one or more LTFs and one or more signal fields, in an embodiment. The DL NDPs 336 omit data portions. The DL NDPs 336 are illustrated in FIG. 3A as being transmitted in different frequency bandwidth portions (e.g., OFDMA). In some embodiments, the DL NDPs 336 are transmitted using different spatial streams (e.g., MU-MIMO).

When transmitting the DL NDPs 336, the AP 114 records a time $t_{3,k}$ at which the AP 114 began transmitting a particular portion of the DL NDP 336 (e.g., an LT portion). Similarly, when each client station 154 receives the corresponding DL NDP 336, the client station 154 records a time $t_{4,k}$ at which the client station 154 began receiving the particular portion of the DL NDP 336 (e.g., the LT portion). As illustrated in FIG. 3B, the AP 114 records the time $t_3$ at which the AP 114 began transmitting the DL NDP 336, and the client station 154 records the time $t_4$ at which the client station 154 began receiving the DL NDP 336.

After the DL NDP transmission 308, the AP 114 transmits a DL MU transmission 338, in an embodiment. The AP 114 begins transmitting the DL transmission 338 a defined time period after an end of the DL NDP transmission 308, in an embodiment. In an embodiment, the defined time period is SIFS. In other embodiments, another suitable time period is utilized. The DL PPDUs 340 include ranging measurement feedback to the client stations 154. The DL PPDUs 340 are illustrated in FIG. 3A as being transmitted in different frequency bandwidth portions (e.g., OFDMA). In some embodiments, the DL PPDUs 340 are transmitted using different spatial streams (e.g., MU-MIMO).

The PPDUs 340 correspond to downlink ranging measurement feedback packets. The PPDUs 348 respectively include the recorded times $t_{2,k}$ and $t_{3,k}$.

After receipt of its respective PPDU 340, the client station 154 calculates a time-of-flight between the client station 154 and the AP 114 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. A distance between the client station 154 and the AP 114 may be calculated using the calculated time-of-flight, e.g., by respectively multiplying the time-of-flight by the speed of light, according to an embodiment.

In some embodiments, the client station 154 calculates its estimated position using the calculated time-of-flight. For example, the client station 154 uses triangulation techniques to calculate its estimated position using the calculated time-of-flight.

In an embodiment, the AP 114 transmits a PPDU 342 that includes a trigger frame to prompt the group of client stations 154 to simultaneously transmit, as part of an UL MU transmission 344, uplink PPDUs 348 that include ranging measurement feedback. The trigger frame in the PPDU 342 prompts multiple client stations 154 to begin simultaneously transmitting the UL MU transmission 344 a defined time period after an end of the PPDU 342. In an embodiment, the defined time period is SIFS. In other embodiments, another suitable time period is utilized.

The UL MU transmission 344 (which may be an UL OFDMA transmission or an UL MU-MIMO transmission) includes UL PPDUs 348 from multiple client stations 154, e.g., STA1, STA2, STA3, and STA4. The PPDUs 348 are illustrated in FIG. 3A as being transmitted in different frequency bandwidth portions. In another embodiment, the UL PPDUs 348 are transmitted using different spatial streams.

The PPDUs 348 correspond to uplink ranging measurement feedback packets. The PPDUs 348 respectively include the recorded times $t_{1,k}$ and $t_{4,k}$.

After receipt of the PPDUs 348, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight.

In an embodiment, the UL NDPs 324 have a format the same as or similar to the PPDU formats discussed above with respect to FIG. 2 (e.g., without the PHY data portion 240). In an embodiment, the DL NDPs 336 have a format the same as or similar to the PPDU formats discussed above with respect to FIG. 2 (e.g., without the PHY data portion 240).

In some embodiments, a single user (SU) ranging measurement exchange between the AP 114 and one client station 154 (or between two APs or between two client stations) is similar to the MU ranging measurement exchange discussed above with reference to FIGS. 3A and 3B.

Referring now to FIG. 2, a communication device (e.g., the network interface device 122, the network interface device 162, or another suitable wireless network interface device) receiving an NDP having a PHY data unit format (e.g., such as illustrated in FIGS. 2A or 2B), or another suitable that includes one or more LT fields (e.g., the VHT-LTFs 230 or the HE-LTFs 280) may determine a time of arrival corresponding to the one or more LT fields. For example, in an embodiment, the communication device performs a cross-correlation between a received signal and a known signal corresponding to the one or more LT fields, and a peak in the correlation signal corresponds to detection of the one or more LT fields in the packet; and the communication device determines a time of arrival of the packet using a time at which the peak in the correlation signal is detected.

As discussed above, a malicious actor with a wireless device (attacker) may attempt to trick a first communication device into mistakenly determining that a second communication device is closer than the second communication device is in reality. For example, when the second communication device (i.e., the actual communication device participating in the NDP ranging measurement exchange, sometimes referred to herein as the "true device") transmits an NDP to the first communication device as part of a ranging measurement, the attacker transmits another NDP (or at least a portion of the NDP, e.g., an LT portion of the NDP) with a time advance. The transmission by the attacker may cause the first communication device to mistakenly determine that the second communication device is closer than the second communication device is in reality.

For example, if the LT fields (e.g., the VHT-LTFs 230 or the HE-LTFs 280) in an NDP are used to determine a time of arrival of the packet, and the content of the LT fields are publicly known (e.g., because they are defined by a communication protocol to have a fixed content), the attacker can transmit additional LTFs with a time advance with respect to an NDP transmitted by the true device. The transmission of the additional LTFs by the attacker may cause the first communication device to mistakenly determine that the true device is closer than the true device is in reality.

If the fields (e.g., the VHT-LTFs 230 or the HE-LTFs 280) in an NDP are used to determine a time of arrival of the packet, and the content of the LT fields are not publicly known (e.g., because the first communication device and second communication device securely agreed ahead of time on what content should be included in the LTFs), the attacker can instead detect an NDP transmitted by the second communication device, record a portion of an LT in the NDP, and use the recorded portion to transmit an additional LT with a time advance with respect to an NDP transmitted by the true device. Such a malicious action is sometimes referred to as a "replay attack".

Figure 4:
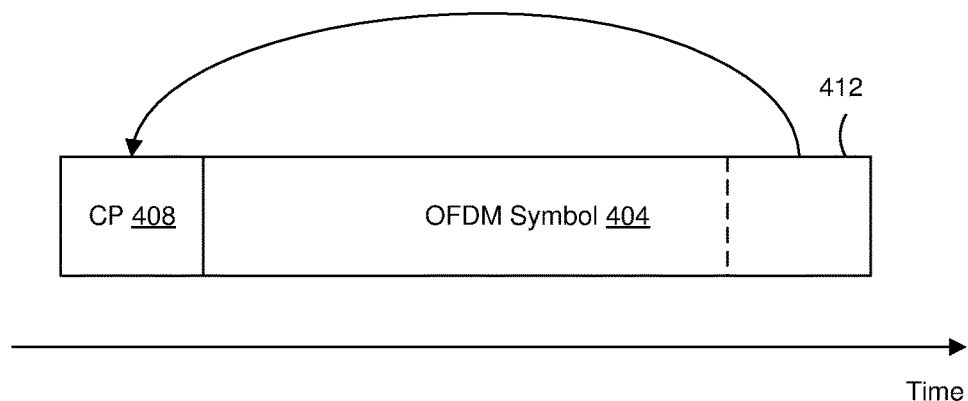
FIG. 4 is a diagram of an example time-domain signal corresponding to a training field that may be used in connection with determining a time at which a null data packet (NDP) is received, according to some embodiments.

LT fields such as the VHT-LTFs 230 and the HE-LTFs 280 have certain characteristics that can be exploited by an attacker in a replay attack. FIG. 4 is a diagram of an example time-domain signal 400 corresponding to an LT (e.g., one of the VHT-LTFs 230 or one of the HE-LTFs 280) that may be used in connection with determining a time at which an NDP is received, according to some embodiments. The time-domain signal 400 comprises an OFDM symbol 400. Additionally, in a guard interval (GI) between the OFDM symbol and a previously transmitted OFDM symbol (not shown), a cyclic prefix (CP) 408 is transmitted, where the CP 408 is a copy of an end portion 412 of the OFDM symbol 404.

Figure 5:
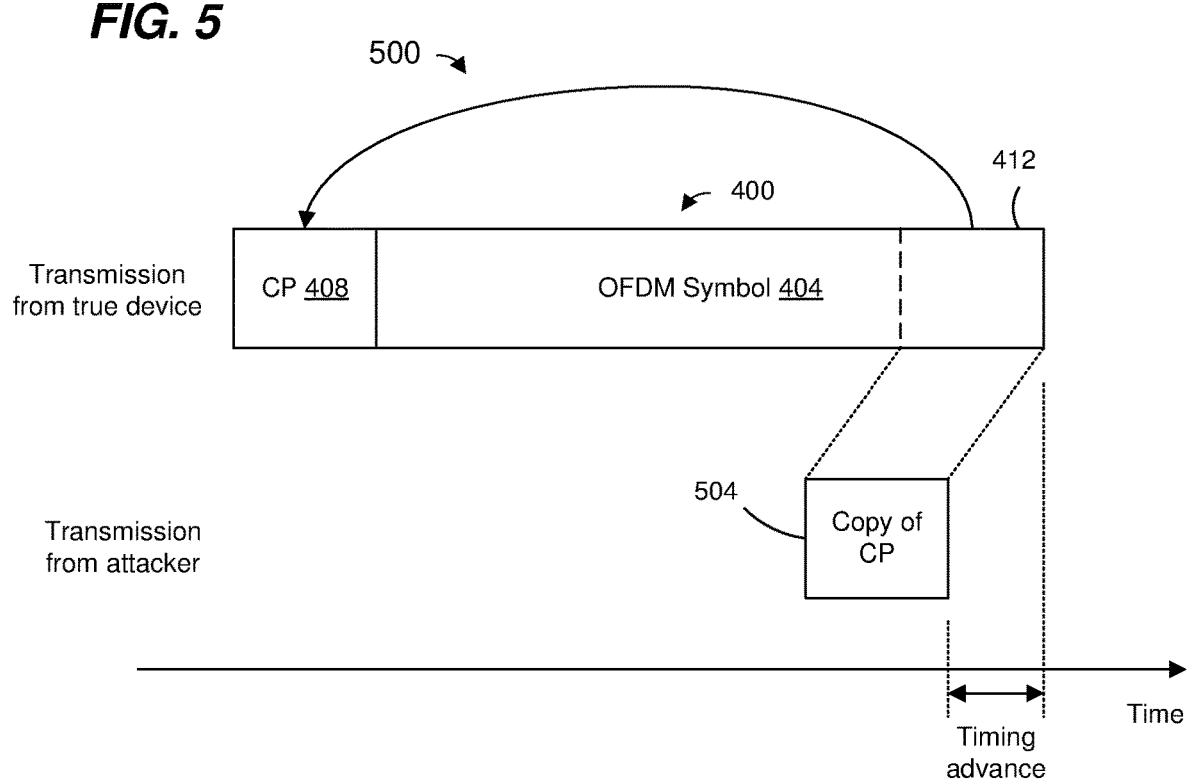
FIG. 5 is a timing diagram of an example cyclic prefix (CP) replay attack in connection with the time-domain signal of FIG. 4.

FIG. 5 is a timing diagram of an example CP replay attack 500 in connection with the time-domain signal 400 of FIG. 4. In the CP replay attack 500, the attacker detects transmission of the LT 404 and records a copy 504 of the CP 408. Knowing that the CP 408 is a copy of the end portion 412 of the OFDM symbol 404, the attacker transmits the recorded copy 504 of the CP 408 with a timing advance with respect to the end portion 412 of the OFDM symbol 404 transmitted by the true device. Another communication device participating in the NDP ranging measurement exchange that receives both i) the transmission 400 from the true device and ii) the transmission 504 from the attacker, generates a correlation signal by correlating the received signals with a known LT signal. The correlation signal includes a peak corresponding to the advanced, replayed CP 408 transmitted (504) by the attacker, and the communication device participating in the NDP ranging measurement exchange may therefore inadvertently determine that the true device is closer than in reality, under some circumstances.

To guard against a replay attack such as illustrated in FIG. 5, LTFs in NDPs for ranging measurements can omit CPs. For instance, no GI interval may be included between the LTFs, or if GIs are included, the signal transmitted in the GIs is not a copy of a portion of an LT.

If all of the LTFs in the NDP include the same content, even if that content is not publicly known prior to transmission of the NDP, a malicious actor can use the first NDP in the NDP to perform a replay attack.

Figure 6:
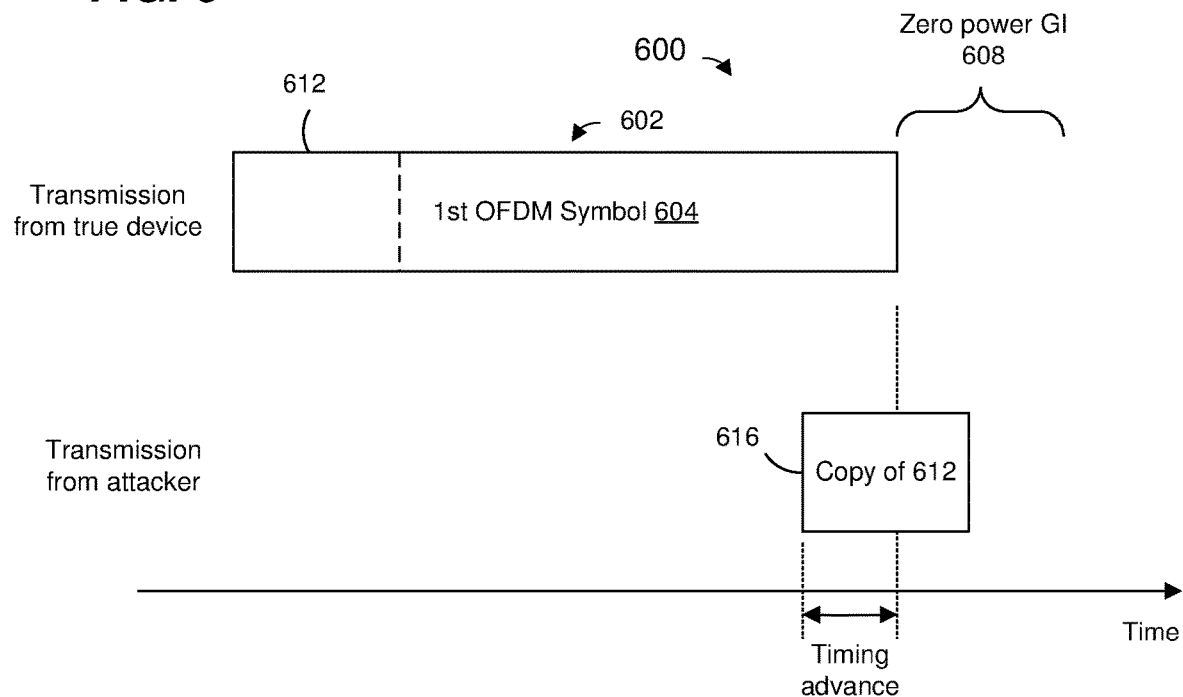
FIG. 6 is a timing diagram of an example guard interval (GI) replay attack in connection with a time-domain signal that does not include GIs or CPs.

FIG. 6 is a timing diagram of an example GI replay attack 600 in connection with a time-domain signal 602 that does not include CPs. The GI replay attack 600 is effective with receivers that utilize an overlap-add method to generate a correlation signal to detect LTFs. The overlap-add method includes calculating an FFT of the received signal across a window of samples having a duration equal to a duration of the OFDM symbols in the transmitted signal, i.e., the duration of the window does not include a duration of a GI.

The time-domain signal 602 includes an OFDM symbol 604 corresponding to an LT. A zero-power GI 608 follows the OFDM symbol 604. In the GI replay attack 600, the attacker detects transmission of the LT and records a copy 616 of a first quarter 612 of the OFDM symbol 604. The attacker transmits the recorded copy 616 with a timing advance with respect to an end of the OFDM symbol 604 transmitted by the true device. Another communication device participating in the NDP ranging measurement exchange that receives both i) the transmission 602 from the true device and ii) the transmission 616 from the attacker, generates a correlation signal by correlating the received signals with a known LT signal using the overlap-add method, i.e., using an FFT window with a duration equal to a duration of the OFDM symbol 604. When using the overlap-add method, the correlation signal includes a peak corresponding to the copy 616 transmitted by the attacker that appears to occur before a peak due to the transmission from the true device, and the communication device participating in the NDP ranging measurement exchange may therefore inadvertently determine that the true device is closer than in reality, under some circumstances.

Figure 7:
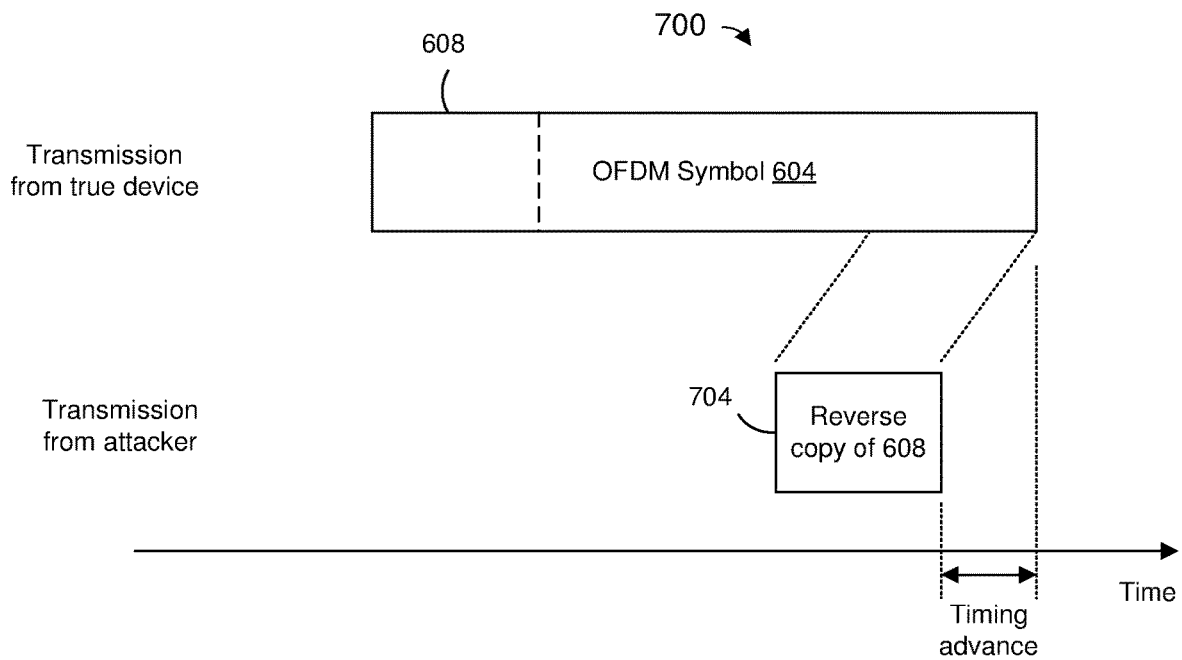
FIG. 7 is a timing diagram of an example reverse replay attack in connection with the time-domain signal discussed with respect to FIG. 6.

FIG. 7 is a timing diagram of an example reverse replay attack 700 in connection with the time-domain signal 604 discussed with respect to FIG. 6. If the time-domain signal 604 corresponds to an LT in which each OFDM subcarrier has a real value in the frequency domain (e.g., if all OFDM sub carriers a modulated using binary phase shift keying (BPSK)), time-domain signal 604 is conjugate complex symmetric. Thus, the first (in time) quarter 612 of the OFDM symbol 604 is a reversed conjugate of the last (in time) quarter of the OFDM symbol 604. In the reverse replay attack 700, the attacker detects transmission of the LT and records a copy of the first quarter 608 of the OFDM symbol 604, and then generates a reversed conjugate copy 704 of the first quarter 612 of the OFDM symbol 604. The attacker transmits the reversed conjugate copy 704 with a timing advance with respect to the last quarter of the OFDM symbol 604 transmitted by the true device. Another communication device participating in the NDP ranging measurement exchange that receives both i) the transmission 604 from the true device and ii) the transmission 704 from the attacker, generates a correlation signal by correlating the received signals with a known LT signal. The correlation signal includes a peak corresponding to the reversed conjugate copy 704 transmitted by the attacker, and the communication device participating in the NDP ranging measurement exchange may therefore inadvertently determine that the true device is closer than in reality, under some circumstances.

Various NDP generation techniques are described below, at least some of which are designed to defend against various types of replay attacks such as discussed above. In various embodiments, the various NDP generation techniques described below are used separately. In other embodiments, suitable combinations of two or more of the various NDP generation techniques described below are used.

To defend against CP and GI replay attacks such as described with reference to FIGS. 5 and 6, LTFs in an NDP used in a ranging measurement exchange are transmitted with GIs and with signal samples set to zero during the GIs (sometimes referred to herein as "zero-padded OFDM" or "ZP-OFDM"), rather than using CPs, according to some embodiments. In some embodiments, the GIs of data packets that are not used for ranging measurements do not use ZP-OFDM.

Figure 8:
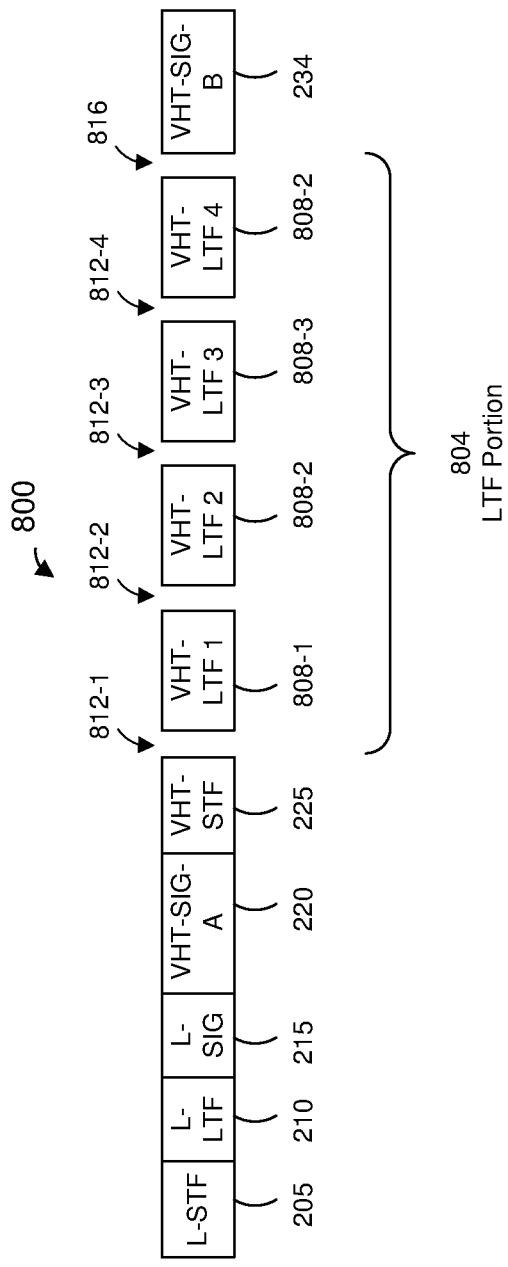
FIG. 8 is a diagram of an example null data packet (NDP) for secure ranging measurement, according to an embodiment.

FIG. 8 is a diagram of an example NDP 800 for secure ranging measurement, according to an embodiment. The NDP 800 employs includes an LT portion 804 that employs ZP-OFDM to defend against certain replay attacks such as CP and GI replay attacks. The NDP 800 include elements similar to those of the PPDU 200 of FIG. 2, and like-numbered elements are not discussed in detail for purposes of brevity.

The LT portion 804 of the NDP 800 includes a plurality of LTFs 808. In an embodiment, each LT 808 corresponds to a respective OFDM symbol. A guard interval 812 is included prior to each OFDM symbol 808 in the LT portion 804. In an embodiment, signal samples in GIs 812 between adjacent OFDM symbols 808 are set to zero. In an embodiment, signal samples in GIs 812 before each OFDM symbol 808 are set to zero. Signal samples in a GI 816 after a last OFDM symbol 808 in the LT portion 804 are also set to zero, according to an embodiment. In an embodiment, signal samples in GIs 812 after each OFDM symbol 808 are set to zero. Signal samples in the GI 812-1 before a first OFDM symbol 808 in the LT portion 804 are also set to zero, according to an embodiment.

In an embodiment, signal samples in GIs between OFDM symbols corresponding to other fields of the NDP 800 (e.g., L-STF 205, L-LTF 210, L-SIG 215, VHT-SIG-A) are not set to zero. For instance, in an embodiment, CPs are included in GIs between OFDM symbols corresponding to other fields of the NDP 800 (e.g., L-STF 205, L-LTF 210, L-SIG 215, VHT-SIG-A, etc.).

The set of frequency domain values of OFDM sub carriers of an LT may be referred to as a "training field sequence" or "pilot sequence".

In an embodiment, to defend against reverse replay attacks such as described with reference to FIG. 7, OFDM sub carriers of an LT are modulated using quadrature phase shift keying (QPSK) so that frequency domain values of the OFDM sub carriers are not all real values. In an embodiment, values of the training field sequence of an LT correspond to QPSK modulation. In an embodiment, in which values of the training field sequence of the LT correspond to QPSK modulation, at least some values of the training field sequence are complex numbers.

In data packets that are not used for ranging measurements, however, the frequency domain values of the OFDM sub carriers for LTFs are only real values, according to an embodiment. Thus, the LTFs used for NDPs for ranging measurements have different content than LTFs used for data packets and NDPs that are not used for ranging measurements, in some embodiments. For example, the content of LTFs for data packets (and NDPs not used for ranging measurements) is predefined by the communication protocol, is designed for channel measurement purposes, and is the same for every data packet. In an embodiment, the content of VHT-LTFs 230 (or HE-LTFs 280) for data packets (and NDPs not used for ranging measurements) is the same for each of the multiple VHT-LTFs 230 (or HE-LTFs 280) in the data packets (and NDPs not used for ranging measurements).

In some embodiments, the amplitudes of all frequency domain values of OFDM sub carriers of an LT for a ranging measurement NDP are restricted to be a same value. In an embodiment, the same value is one. In an embodiment, all values of the training field sequence have a same amplitude, but may have different phases.

The set of frequency domain values of OFDM sub carriers of an LT may be referred to as a training field sequence. In an embodiment, to defend against replay attacks in which a first LT (or a portion thereof) is copied and then retransmitted with a time-advance with respect to later LTFs, each LT in an NDP for ranging measurement uses a different training field sequence, unlike VHT-LTFs or HE-LTFs in data packets and non-ranging measurement NDPs, where each VHT-LT or each HE-LT uses the same training field sequence.

In an embodiment, the transmitter of the NDP informs an intended receiver of the NDP, e.g., prior to transmitting the NDP or after transmitting the LTFs, the training field sequence(s) that will be (or were) used for the LTF(s) in the NDP. Thus, when the NDP is transmitted, the training field sequence(s) used for LTF(s) in the NDP are unknown to the attacker, whereas the intended receiver knows the training field sequence(s) that are used for LTF(s) in the NDP. In an embodiment, the transmitter of the NDP conveys training field sequence information to the intended receiver in a secure manner such that the attacker cannot determine ahead of time the training field sequence(s) that will be used for the LTF(s) in the NDP.

In an embodiment, the training field sequence for an LTF can be specified using a bit sequence that specifies the particular frequency domain values for all subcarriers of the LTF. For instance, for a 20 MHz-wide NDP, with an LTF having 56 OFDM subcarriers, and using QPSK, there are $4^{56} > 10^{33}$ possible training field sequences, which would require a bit sequence of 2*56 bits (28 bytes) to specify the training field sequence. As another example, an 80 MHz-wide NDP, with an LTF having 242 OFDM subcarriers, and using QPSK, would require a bit sequence of 242 bytes to specify the training field sequence. In some embodiments, the NDP may include up to eight LTFs and each LTF may use a different training field sequence, thus the number of bytes required to specify each training field sequence used for LTFs of an NDP may be relatively large, e.g., hundreds or thousands of bytes. Specifying the training field sequence for an LTF using a bit sequence is very secure (it would be extremely difficult for the attacker to guess the training field sequence), but the channel medium overhead required to convey the bit sequence to the intended receiver of the NDP is high.

In some embodiments, a training field sequence for an LTF is generated as a pseudorandom sequence from a much shorter length bit sequence sometimes referred to herein as a "seed". The generated pseudorandom sequence specifies the particular frequency domain values for all subcarriers of the LTF. The pseudorandom sequence is generated from the seed using an algorithm known to both the transmitter of the NDP and the intended recipient. In such embodiments, the transmitter of the NDP informs an intended receiver of the NDP, prior to transmitting the NDP, the seed(s) that will be used to generate the training field sequence(s) for the LTF(s) in the NDP. Specifying the training field sequence for an LTF using a seed is less secure than the approach described in the previous paragraph, but the channel medium overhead required is also significantly reduced as compared to the approach described in the previous paragraph.

In an embodiment, the seed has a length that is at most ½ of a length of the pseudorandom sequence. In another embodiment, the seed has a length that is at most ¼ of the length of the pseudorandom sequence. In another embodiment, the seed has a length that is at most 1/10 of the length of the pseudorandom sequence.

In an embodiment, the pseudorandom sequence is generated by providing a seed as an input to a forward error correction (FEC) encoder, and the output generated by the FEC encoder corresponds to the pseudorandom sequence. In an embodiment, the FEC encoder has a coding rate of ½ or smaller, e.g., meaning that the output of the FEC encoder has a length that is at least twice the length of the seed. In an embodiment in which the communication devices involved in the NDP ranging measurement exchange include an FEC encoder for encoding payload information in packets, the FEC encoder could be reused for the purpose of generating LTFs for use in secure ranging measurement exchanges. In an embodiment, the FEC encoder is a binary convolutional code (BCC) encoder. In another embodiment, the FEC encoder is a low density parity check (LDPC) encoder. In other embodiments, other suitable FEC encoders are used.

As an illustrative example, for a 20 MHz-wide NDP, with an LTF having 56 OFDM subcarriers, using QPSK, and using a rate ½ FEC encoder, there are $2^{56} > 10^{16}$ possible training field sequences. The required length of the seed in this example would be 56 bits (14 bytes); for eight LTFs, 112 bytes would be required to be conveyed to the intended recipient of the NDP.

An FEC encoder is included in the network interface device 122 (e.g., in the PHY processor 130) and the network interface device 162 (e.g., in the PHY processor 170), according to some embodiments.

In another embodiment, the pseudorandom sequence is generated by providing a seed to a pseudorandom sequence generator circuit that comprises a linear feedback shift register circuit with a sequence of memory elements coupled in series. An initial memory element receives a feedback, and a last memory element outputs the pseudorandom sequence. A generator polynomial defines how outputs of the memory elements are to be combined to generate the feedback to the initial memory element. The seed corresponds to initial values of the memory elements and is loaded into the memory elements before generation of the pseudorandom sequence begins.

Figure 9:
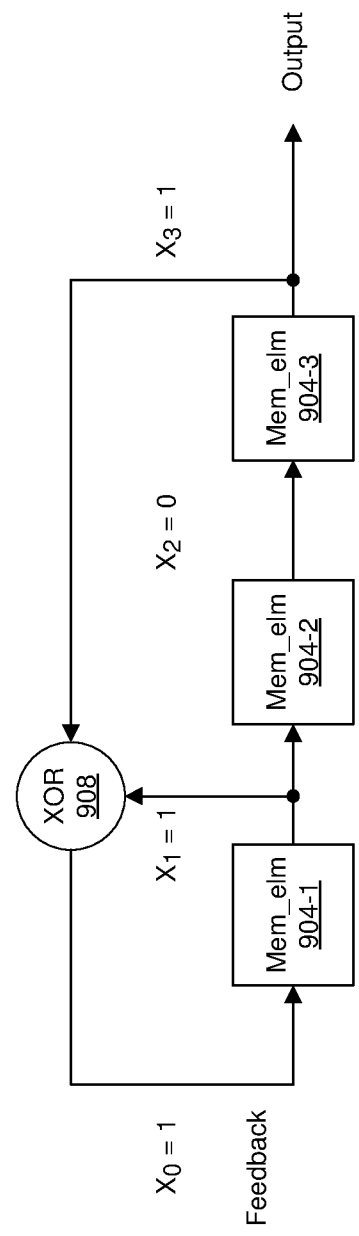
FIG. 9 is a diagram of a simplified, example pseudo random sequence generator circuit, according to an embodiment.

FIG. 9 is a diagram of a simplified, example pseudorandom sequence generator circuit 900, according to an embodiment.

The pseudorandom sequence generator circuit 900 comprises a shift register circuit having a plurality of memory elements 904 coupled in series. An exclusive-OR (XOR) circuit 908 calculates an XOR result based on a plurality of inputs received from multiple memory elements 904-1, and the XOR result corresponds to a feedback. An initial memory element 904-1 receives the feedback, and a last memory element 904-3 outputs the pseudorandom sequence. A generator polynomial defines how outputs of the memory elements 904 are to be combined to generate the feedback to the initial memory element 904-1. In the example circuit of FIG. 9, the generator polynomial is $[x_3\ x_2\ x_1\ x_0] = [1\ 0\ 1\ 1]$. The seed corresponds to initial values of the memory elements 904 and is loaded into the memory elements before generation of the pseudorandom sequence begins.

In some embodiments, the output of the pseudorandom sequence generator circuit is further processed before generating the training field sequence for the LTF according to operations already known to the intended receiver, so that the intended receiver can regenerate the training field sequence. For example, in various embodiments, one or more further operations are performed on the output of the pseudorandom sequence generator circuit: i) interleaving, ii) scrambling, iii) providing the output of the pseudorandom sequence generator circuit to an FEC decoder to generate a longer bit sequence, such as described above, etc.

The example pseudorandom sequence generator circuit 900 is a simplified pseudorandom sequence generator described herein for explanatory purposes. In other embodiments, more than three memory elements 904 are utilized, and different generator polynomials are used. In an embodiment, the generator polynomial(s) are selected to generate a "maximum length pseudorandom sequence". In an embodiment, the pseudorandom sequence generator circuit includes N memory elements, to generate a pseudorandom sequence of length $2^N-1$, where N is a suitable positive integer greater than 2. Thus, the length of the seed is N, in an embodiment.

A pseudorandom sequence generator circuit having a structure similar to the example pseudorandom sequence generator circuit 900, but with more memory elements (e.g., N>>3) is included in the network interface device 122 (e.g., in the PHY processor 130) and the network interface device 162 (e.g., in the PHY processor 170), according to some embodiments.

FIG. 10 is a flow diagram of an example method 1000 for generating an NDP for a range measurement signal exchange session between a first communication device and a second communication device, according to an embodiment. The network interface device 122 is configured to implement the method 1000, in an embodiment. Additionally or alternatively, the network interface device 162 is configured to implement the method 1000, in an embodiment.

At block 1004, the first communication device generates NDP for the range measurement signal exchange session between the first communication device and the second communication device. In an embodiment, generating the NDP includes: generating a plurality of training fields to be used by the second communication device to determine a time of arrival of the NDP, wherein each training field corresponds to a respective OFDM symbol. In an embodiment, the NDP has a structure similar to the PHY data unit 200 (without the data portion 240) discussed above with respect to FIG. 2A, and the plurality of training fields are the plurality of VHT-LTFs 230. In another embodiment, the NDP has a structure similar to the PHY data unit 250 (without the data portion 290) discussed above with respect to FIG. 2B, and the plurality of training fields are the plurality of HE-LTFs 280. In other embodiments, the NDP has another suitable structure, and the plurality of training fields are a plurality of long training fields in the NDP in a non-legacy portion of the NDP. In other embodiments, the NDP has another suitable structure (e.g., the NDP does not include a legacy portion) and the plurality of training fields are suitable for and intended for use by a receiving device to detect a time of arrival of the NDP.

In an embodiment, generating the plurality of training fields includes: setting signal samples corresponding to guard intervals between the OFDM symbols to zero. In an embodiment, generating the plurality of training fields additionally or alternatively includes: for each OFDM symbol, setting a plurality of frequency domain values corresponding to OFDM subcarriers of the OFDM symbol to complex number values. For example, in an embodiment, the plurality of frequency domain values corresponding to the OFDM subcarriers correspond to QPSK modulation.

At block 1008, the first communication device transmits the NDP as part of the range measurement signal exchange session.

In an embodiment, the method 1000 further includes: the first communication device selecting respective sequences for the plurality of training fields, wherein the selected sequences respectively specify frequency domain values for the respective OFDM symbols; and transmitting, by the first communication device, respective indications of the sequences to the second communication device. In an embodiment, generating the plurality of training fields further includes generating the OFDM symbols according to the selected sequences.

In an embodiment, the respective indications of the sequences are transmitted to the second communication device prior to transmitting the NDP.

In an embodiment, the selected sequences are different sequences such that a signal in each training field is different than signals in other ones of the training fields.

In an embodiment, transmitting the respective indications of the sequences to the second communication device comprises transmitting the respective sequences to the second communication device.

In an embodiment, selecting the respective sequences for the plurality of training fields comprises: selecting respective seed values for generating the respective sequences; transmitting the respective indications of the sequences to the second communication device comprises transmitting the respective seed values; and generating the OFDM symbols according to the selected sequences includes generating, at the first communication device, the respective sequences using the respective seed values. In an embodiment, a length of each seed value is at most ½ of a length of the corresponding sequence. In another embodiment, a length of each seed value is at most ¼ of a length of the corresponding sequence. In another embodiment, a length of each seed value is at most ⅛ of a length of the corresponding sequence. In another embodiment, a length of each seed value is at most ¹⁄₁₀ of a length of the corresponding sequence.

In an embodiment, generating the respective sequences using the respective seed values includes, for each sequence: providing the seed as an input to a forward error correction (FEC) encoder of the first communication device, wherein the FEC encoder implements an FEC code having a coding rate of at most ½; and generating, using the FEC encoder, an output sequence based on the seed. In an embodiment, the FEC encoder is a BCC encoder. In another embodiment, the FEC encoder is an LDPC encoder.

In another embodiment, generating the respective sequences using the respective seed values includes, for each sequence: providing the seed to a pseudorandom sequence generator circuit of the first communication device, wherein the pseudorandom sequence generator circuit comprises a linear feedback shift register circuit with a sequence of memory elements coupled in series; and generating, using the pseudorandom sequence generator circuit, an output sequence based on the seed. In an embodiment, the pseudorandom sequence generator circuit is configured to use a generator polynomial. In an embodiment, the pseudorandom sequence generator circuit is configured to generate maximum length pseudorandom sequences.

Figure 11:
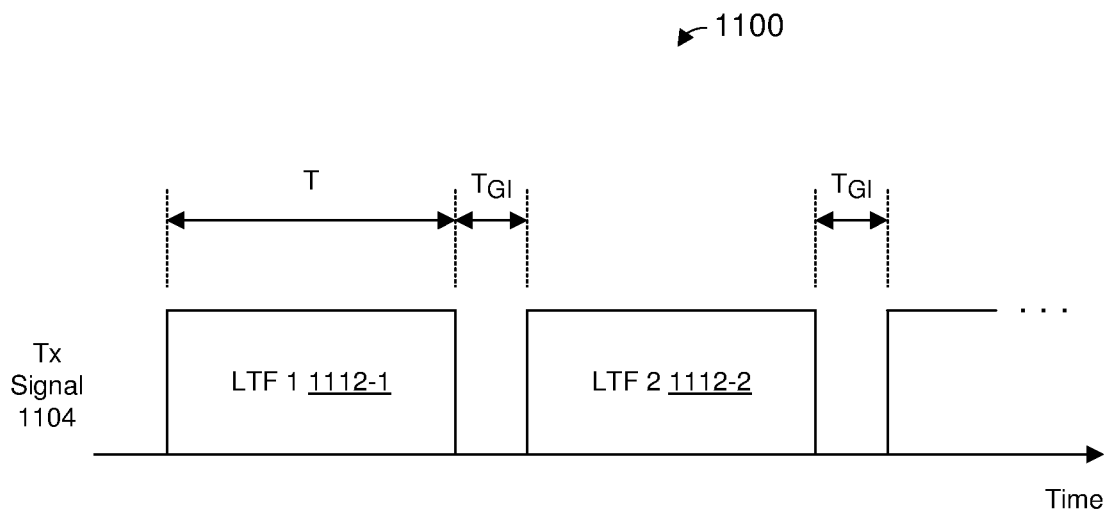
FIG. 11 is a timing diagram showing a signal (TX Signal) generated at a transmitter of an NDP, and a corresponding signal (Rx Signal) at a receiver of the NDP, according to an embodiment.

FIG. 11 is a timing diagram showing a signal (TX Signal) 1104 generated at a transmitter of an NDP, and a corresponding signal (Rx Signal) 1108 at a receiver of the NDP, according to an embodiment. The TX Signal 1104 and the Rx Signal 1108 correspond to a plurality of LTFs 1112 within the NDP, where each LTF 1112 corresponds to an OFDM symbol, where the transmitter sets signal samples corresponding to GIs between the OFDM symbols to zero.

A time duration of each OFDM symbol is T, and a time duration of each GI is $T_{GI}$. At the receiver, the Rx signal 1108 includes, in connection with each LTF 1112, a channel spread portion 1116 within each following GI caused by wireless channel effects. Signal sample at the receiver, for each LTF 1112, span a time duration of $T'=T+T_{GI}$, according to an embodiment.

A transmitted time domain signal x(t) corresponding to each LTF can be modeled as:

$$x(t) = \sum_{n \in S} s[n] e^{i2\pi f_n t}, t \in [0, T] \qquad \text{Equation 1}$$

where s[n] is a frequency-domain value corresponding to an n-th OFDM subcarrier, n is an OFDM subcarrier index, S is a set of OFDM subcarrier indices, and $f_n$ is a frequency of the n-th OFDM subcarrier. In an embodiment, the OFDM subcarriers have a frequency spacing of 1/T.

In an embodiment, at least some of the values of s[n] are complex number values. In an embodiment, all of the values of s[n] have a same amplitude (e.g., one or another suitable amplitude). In an embodiment, the values of s[n] correspond to QPSK modulation.

A frequency domain X(f) representation of x(t) can be modeled as:

$$X(f) = \frac{1}{T} \int_0^{T'} x(t) e^{-i2\pi f t} dt = \sum_{n \in S} s[n] e^{i\pi T(f_n - f)} \frac{\sin(\pi T(f_n - f))}{\pi T(f_n - f)} \qquad \text{Equation 2}$$

In embodiments in which all of the values of s[n] have a same amplitude (e.g., one), the amplitude of X(f) at $f=f_n$ will be the same amplitude (e.g., one), whereas the amplitude of X(f) at $f \neq f_n$ will be different than the same amplitude (e.g., will not be equal to one) and will depend on all s[n] for n∈S.

As discussed above with respect to FIG. 6, if a receiver device uses an overlap-add method to detect reception of an LTF (e.g., the FFT processing window has a duration of T), a malicious actor can use a GI replay attack to trick the receiver device into determining that the LTF was received earlier than in reality. Thus, example techniques that involve using a longer duration FFT processing window to detect reception of an LTF are discussed below.

Figure 12:
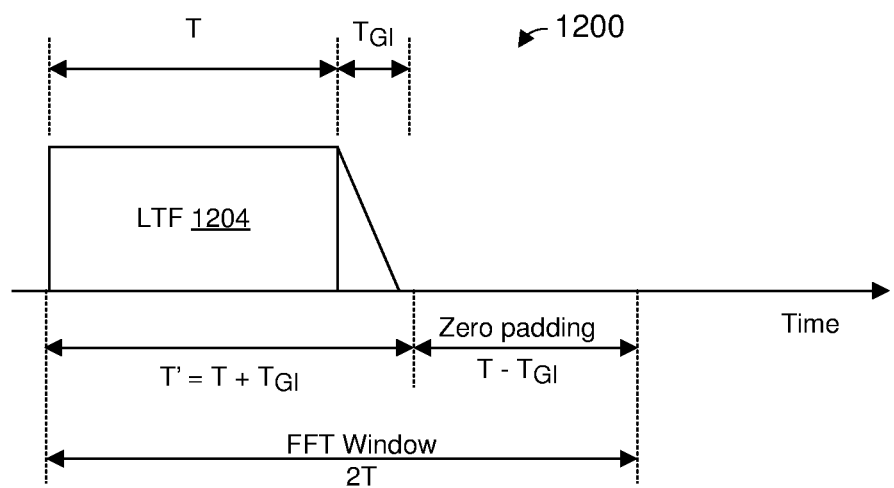
FIG. 12 is a diagram illustrating processing of a received time-domain signal at a receiver, according to an embodiment.

FIG. 12 is a diagram illustrating processing of a received time-domain signal at a receiver, where the received signal corresponds to an LTF field of an NDP, according to an embodiment. The receiver generates samples of the received time-domain signal for time duration of $T'=T+T_{GI}$, which corresponds to the OFDM symbol of the LTF and the following GI. Additionally, the receiver zero appends additional zero-value samples (sometimes referred to as "zero padding") to the samples corresponding to the OFDM symbol and the GI so that a total number of samples corresponds to a time duration of 2T.

Figure 13:
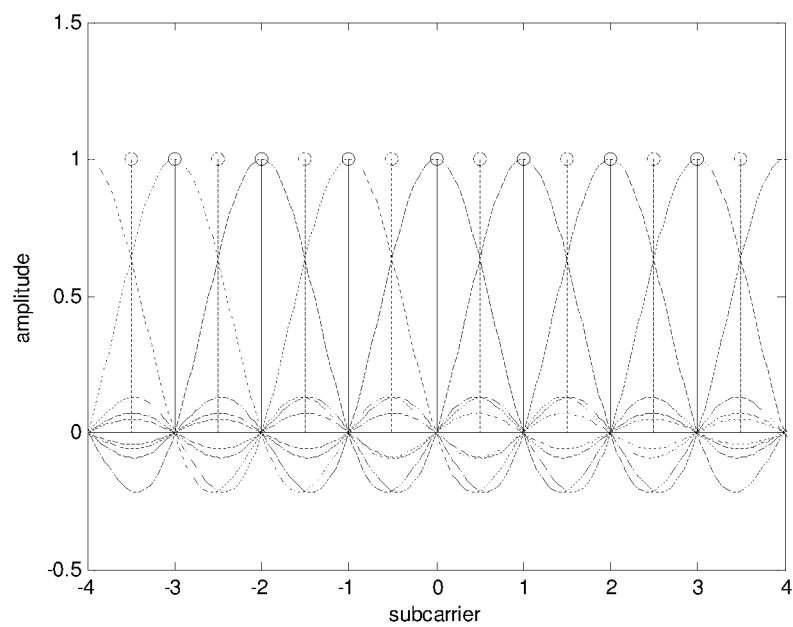
FIG. 13 is a graph illustrating an example frequency-domain representation of zero-padded samples corresponding to an OFDM symbol of a training field, and a following GI.

A DFT is then performed on the zero-padded samples (e.g., using an FFT calculator circuit) to generate a frequency-domain representation of the zero-padded samples. FIG. 13 is a graph illustrating an example frequency-domain representation of zero-padded samples corresponding to an OFDM symbol of an LTF and a following GI. In an embodiment, the even-indexed frequency components (e.g., X[2k], where X[k] is the output of the FFT calculator, and k is a frequency index) correspond to s[k] in Equations 1 and 2, i.e., the orthogonal OFDM subcarriers generated by the transmitter. On the other hand, the odd-indexed frequency components (e.g., X[2k+1]) are not orthogonal and thus all of the values s[k] contribute to each odd-indexed frequency component in X.

The odd-indexed frequency components can be modeled according to:

$$X[2k+1] = \sum_{n \in S} s[n] e^{i\pi(n-k-1/2)} \frac{\sin(\pi(n-k-1/2))}{\pi(n-k+1/2)} = \sum_{\delta} s[k+\delta] \frac{2i}{\pi(2\delta-1)} \quad \text{Equation 3}$$

where δ is an index corresponding to a frequency distance from the component k. The odd-indexed frequency components can also be represented according to:

$$X[2k+1] = \quad \text{Equation 4}$$
$$c_1(s[k-1] - s[k+1]) + c_2(s[k-2] - s[k+2]) + \ldots - c_1 =$$
$$\frac{2i}{\pi}, c_2 = \frac{2i}{3\pi}, c_3 = \frac{2i}{5\pi}, \ldots$$

As can be seen in Equation 4, the contributions to a particular odd-indexed frequency component X[2k+1] of values of s[k+δ] decrease as the magnitude of δ increases because the magnitude of the coefficient $c_\delta$ decreases as the magnitude of δ increases. Therefore, an approximation of X[2k+1] can be generated according to Equation 3 by summing across only some values of δ corresponding to the values of s[n] nearest in frequency to k. For example, an approximation of X[2k+1] using six values of s[n] nearest in frequency to k can be generated according to six values of δ:

$$\tilde{X}_6[2k+1] = \sum_{\delta=-3}^{2} s[k+\delta] \frac{2i}{\pi(2\delta-1)} \quad \text{Equation 5}$$

Other approximations using different numbers of values of δ (e.g., two values of δ, four values of δ, eight values of δ, ten values of δ, etc.) can be generated based on equations similar to Equation 5.

As discussed above, in some embodiments the transmitter of the NDP selects which frequency domain value sequences s[n] are to be used for generating the LTFs in the NDP, and then sends indications of the selected frequency domain value sequences s[n] to the receiver. After the receiver determines the selected frequency domain value sequences s[n], the receiver can generate frequency domain approximations $\tilde{X}$ of the selected frequency domain value sequences s[n] zero-padded to 2T. For instance, the even-indexed frequency components of $\tilde{X}$ (e.g., $\tilde{X}[2k]$) are set to s[k], and the odd-indexed frequency components of $\tilde{X}$ (e.g., $\tilde{X}[2k+1]$) are calculated according to an equation the same as or similar to Equation 5, according to an embodiment. The receiver can then generate cross-correlations of i) a received signal corresponding to the NDP, and ii) the frequency domain approximations $\tilde{X}$ corresponding to the selected frequency domain value sequences s[n] zero padded to 2T for the LTFs in the NDP. In an embodiment, the receiver generates a cross-correlation according to:

$$C_{Y\tilde{X}} = \sum_k Y[k]\tilde{X}^*[k] \quad \text{Equation 6}$$

where Y[k] is a DFT of samples of the received time-domain signal over time duration of $T'=T+T_{GI}$ and zero-padded to a time duration of 2T (in a manner such as described with reference to FIG. 12). The receiver can then determine a time of arrival of the NDP based on peaks detected in the cross-correlation $C_{Y\tilde{X}}$ corresponding to the LTFs.

Figure 14:
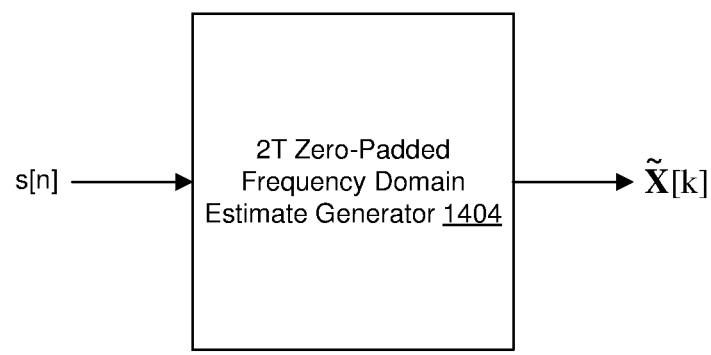
FIG. 14 is a diagram of an example circuit for generating a frequency domain estimates corresponding to a sequence s[n], according to an embodiment.

FIG. 14 is a diagram of an example circuit 1404 for generating frequency domain estimates $\tilde{X}$ corresponding to a sequence s[n] zero padded to 2T, according to an embodiment. Circuit(s) such as the circuit 1404 are included in the network interface device 122 (e.g., in the PHY processor 130) and/or the network interface device 162 (e.g., in the PHY processor 170), according to some embodiments.

The circuit 1404 receives the sequence si[n]. The circuit 1404 is configured to generate even-indexed frequency components of $\tilde{X}$ (e.g., $\tilde{X}[2k]$) set to s[k]. Additionally, the circuit 1404 is configured to generate odd-indexed frequency components of $\tilde{X}$ (e.g., $\tilde{X}[2k+1]$) according to an equation the same as or similar to Equation 5, according to an embodiment.

Figure 15:
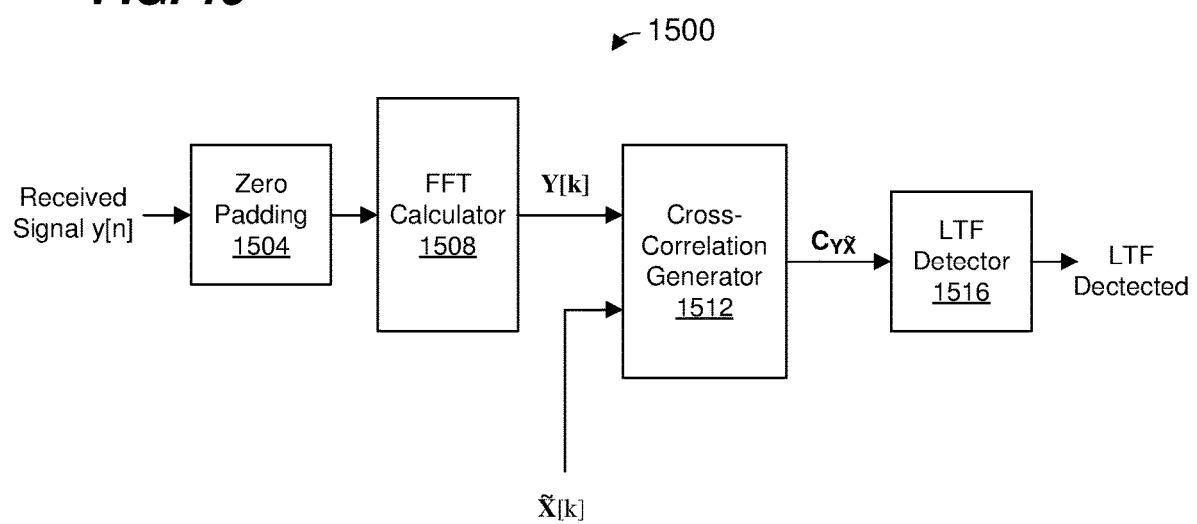
FIG. 15 is a diagram of an example circuit for detecting a training field in a received packet, according to an embodiment.

FIG. 15 is a diagram of an example circuit 1500 for detecting an LTF in a received NDP, according to an embodiment. Circuit(s) such as the circuit 1500 are included in the network interface device 122 (e.g., in the PHY processor 130) and/or the network interface device 162 (e.g., in the PHY processor 170), according to some embodiments.

The circuit 1500 includes a zero padding circuit 1504. The zero padding circuit 1504 receives time-domain signal samples y[n] corresponding to a time duration of $T'=T+T_{GI}$, and is configured to zero-pad the time-domain signal samples to a time duration of 2T (in an manner such as described with reference to FIG. 12). The zero padding circuit 1504 is coupled to an FFT calculator circuit 1508. The FFT calculator circuit 1508 is configured to calculate a DFT of the zero-padded time-domain signal samples received from the zero padding circuit 1504 to generate a frequency-domain representation Y[k] of the zero-padded time-domain signal samples.

The FFT calculator circuit 1508 is coupled to a cross-correlation generator circuit 1512. The cross-correlation generator circuit 1512 receives the frequency-domain representation Y[k] and an estimate frequency domain estimate $\tilde{X}$ corresponding to a sequence s[n] zero padded to 2T, wherein the sequence s[n] corresponds to a frequency-domain representation of an LTF to be detected. The cross-correlation generator circuit 1512 is configured to generate a cross-correlation between Y[k] and $\tilde{X}$, such as according to Equation 6, to generate a signal $C_{Y\tilde{X}}$.

In another embodiment, the receiver (e.g., the network interface 122 and/or the network interface 162) is configured to generate a frequency domain representation X of the sequence s[n] zero padded to 2T, e.g., by generating even-indexed frequency components of X (e.g., X[2k]) set to s[k], and generating odd-indexed frequency components of X (e.g., X[2k+1]) according to Equation 3, for example. In such embodiments, X[k] is provided to the cross-correlation generator circuit 1512, and the cross-correlation generator circuit 1512 is configured to generate a cross-correlation between Y[k] and X[k], such as according to an equation similar Equation 6, to generate a signal $C_{YX}$.

The cross-correlation generator circuit 1508 is coupled to an LTF detector 1504. In an embodiment, the LTF detector 1504 is configured to detect a peak in the signal $C_{Y\tilde{X}}$ (or in $C_{YX}$ in another embodiment), which indicates the LTF corresponding to the sequence s[n] is present in the received signal. The LTF detector 1504 is also configured to generate an indicator when the peak is detected, where the indicator indicates that the LTF corresponding to the sequence s[n] was detected in the received signal. The indicator can be used to determine a time of arrival of the NDP, in an embodiment.

Figure 16:
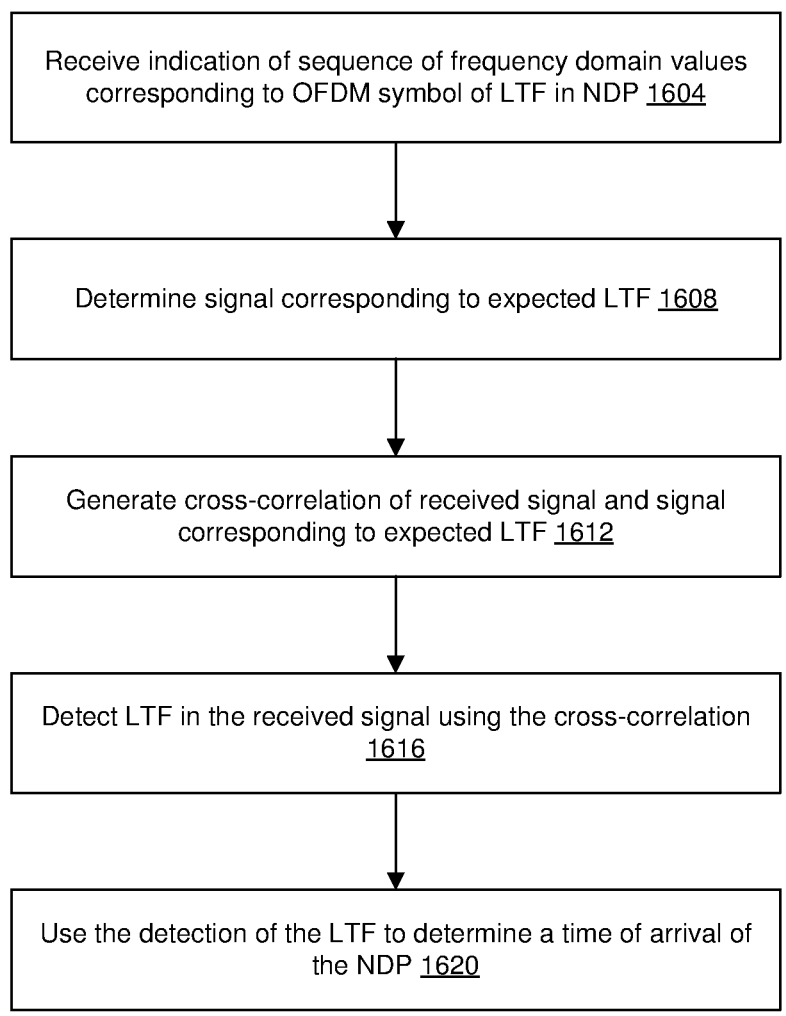
FIG. 16 is a flow diagram of an example method for determining a time of arrival of a packet, according to an embodiment.

FIG. 16 is a flow diagram of an example method 1600 for determining a time of arrival of an NDP for a range measurement signal exchange session between a first communication device and a second communication device, according to an embodiment. The network interface device 122 is configured to implement the method 1600, in an embodiment. Additionally or alternatively, the network interface device 162 is configured to implement the method 1600, in an embodiment.

At block 1604, a first communication device receives an indication of a sequence corresponding to a training field (e.g., a VHT-LTF, an HE-LTF, etc.) in an NDP in a range measurement exchange session. The training field corresponds to an OFDM symbol, and the sequence specifies frequency domain values for the OFDM symbol, according to an embodiment. The sequence includes complex number values, according to an embodiment. The GI after the training field corresponds to a zero power transmit signal, according to an embodiment.

At block 1608, the first communication device determines a signal corresponding to the training field using the indication of the sequence that specifies the frequency domain values for the OFDM symbol corresponding to the training field. In an embodiment, the signal determined at block 1608 is a time-domain signal corresponding to the training field. In an embodiment, the signal determined at block 1608 corresponds to a time-domain representation of the OFDM symbol with a following GI set to zero, and zero-padded to a duration of 2T. In an embodiment, the signal determined at block 1608 is a frequency-domain representation of the OFDM symbol with a following GI set to zero, and zero-padded to a duration of 2T.

At block 1612, the first communication device generates a cross-correlation between a received signal and the signal corresponding to the training field determined at block 1608. In an embodiment, the cross-correlation is generated with i) a set of time-domain samples of the received signal, and ii) a time-domain signal corresponding to the training field determined at block 1608. In an embodiment, the cross-correlation is generated with i) a set of frequency-domain values corresponding to the received signal, and ii) a set of frequency-domain values corresponding to the training field determined at block 1608. In an embodiment, the cross-correlation is generated using techniques discussed with reference to FIGS. 11-15.

At block 1616, the first communication device detects the training field in the received signal using the cross-correlation generated at block 1612. In an embodiment, block 1616 includes detecting peaks in the cross-correlation generated at block 1612.

At block 1620, the first communication device uses the detection of the training field in the received signal to determine a time of arrival at the first communication device of the NDP.

In some embodiments, the indication of the sequence received at block 1604 is a seed value for generating the sequence, wherein a length of the seed value is at most ½ of a length of the sequence. In other embodiments, the length of the seed value is at most ¼ (or ⅛, ¹/₁₀, ¹/₁₆, etc.) of the length of the sequence.

In an embodiment, the first communication device generates the sequence using the seed value. In an embodiment, generating the sequence using the seed value includes: providing the seed as an input to a forward error correction (FEC) encoder of the first communication device, wherein the FEC encoder implements an FEC code having a coding rate of at most ½; and generating, using the FEC encoder, an output sequence based on the seed.

In another embodiment, generating the sequence using the seed value includes: providing the seed to a pseudorandom sequence generator circuit of the first communication device, wherein the pseudorandom sequence generator circuit comprises a linear feedback shift register circuit with a sequence of memory elements coupled in series; and generating, using the pseudorandom sequence generator circuit, an output sequence based on the seed.

In an embodiment, the NDP includes a plurality of training fields; and the training fields corresponds to respective OFDM symbols. In an embodiment, bloc 1604 includes the first communication device receiving respective indications of respective sequences corresponding to the respective training fields in the NDP, wherein the respective sequences specify frequency domain values for the respective OFDM symbols, and wherein each sequence includes complex number values. In an embodiment, block 1608 includes the first communication device determining respective signals corresponding to the respective training fields using the respective indications of the respective sequences. In an embodiment, block 1612 includes the first communication device generating respective cross-correlations between the received signal and the respective signals corresponding to the respective training fields. In an embodiment, block 1616 includes the first communication device detecting the respective training fields in the received signal. In an embodiment, block 1620 includes the first communication device using the respective detections of the respective training fields in the received signal to determine the time of arrival at the first communication device of the NDP.

Embodiment 1: A method, comprising: generating, at a first communication device, a null data packet (NDP) for a range measurement signal exchange session between the first communication device and a second communication device. Generating the NDP includes: generating a plurality of training fields to be used by the second communication device to determine a time of arrival of the NDP. Each training field corresponds to a respective orthogonal frequency divisional multiplexing (OFDM) symbol. Generating the plurality of training fields includes: i) setting signal samples corresponding to guard intervals between the OFDM symbols to zero, and ii) for each OFDM symbol, setting a plurality of frequency domain values corresponding to OFDM subcarriers of the OFDM symbol to complex number values. The method further includes transmitting, by the first communication device, the NDP as part of the range measurement signal exchange session.

Embodiment 2: The method of embodiment 1, further comprising: selecting, at the first communication device, respective sequences for the plurality of training fields, wherein the selected sequences respectively specify frequency domain values for the respective OFDM symbols; and transmitting, by the first communication device, respective indications of the sequences to the second communication device, wherein generating the plurality of training fields further includes generating the OFDM symbols according to the selected sequences.

Embodiment 3: The method of embodiment 2, wherein the selected sequences are different sequences.

Embodiment 4: The method of any of embodiments 2-3, wherein: transmitting the respective indications of the sequences to the second communication device comprises transmitting the respective sequences to the second communication device.

Embodiment 5: The method of any of embodiments 2-3, wherein: selecting the respective sequences for the plurality of training fields comprises: selecting respective seed values for generating the respective sequences, wherein a length of each seed value is at most ½ of a length of the corresponding sequence; transmitting the respective indications of the sequences to the second communication device comprises transmitting the respective seed values; and generating the OFDM symbols according to the selected sequences includes generating, at the first communication device, the respective sequences using the respective seed values.

Embodiment 6: The method of embodiment 5, wherein generating the respective sequences using the respective seed values includes, for each sequence: providing the seed as an input to a forward error correction (FEC) encoder of the first communication device, wherein the FEC encoder implements an FEC code having a coding rate of at most ½; and generating, using the FEC encoder, an output sequence based on the seed.

Embodiment 7: The method of embodiment 5, wherein generating the respective sequences using the respective seed values includes, for each sequence: providing the seed to a pseudorandom sequence generator circuit of the first communication device, wherein the pseudorandom sequence generator circuit comprises a linear feedback shift register circuit with a sequence of memory elements coupled in series; and generating, using the pseudorandom sequence generator circuit, an output sequence based on the seed.

Embodiment 8: An apparatus, comprising: a network interface device associated with a first communication device. The network interface device includes one or more integrated circuits (ICS) configured to: generate a null data packet (NDP) for a range measurement signal exchange session between the first communication device and a second communication device. Generating the NDP includes: generating a plurality of training fields to be used by the second communication device to determine a time of arrival of the NDP, wherein each training field corresponds to a respective orthogonal frequency divisional multiplexing (OFDM) symbol. The one or more ICs are further configured to: i) set signal samples corresponding to guard intervals between the OFDM symbols to zero, and ii) for each OFDM symbol, set a plurality of frequency domain values corresponding to OFDM subcarriers of the OFDM symbol to complex number values. The one or more ICs are further configured to transmit the NDP as part of the range measurement signal exchange session.

Embodiment 9: The apparatus of embodiment 8, wherein the one or more ICS are further configured to: select respective sequences for the plurality of training fields, wherein the selected sequences respectively specify frequency domain values for the respective OFDM symbols; transmit respective indications of the sequences to the second communication device; and generate the OFDM symbols according to the selected sequences.

Embodiment 10: The apparatus of embodiment 9, wherein the selected sequences are different sequences.

Embodiment 11: The apparatus of any of embodiments 9-10, wherein the respective indications of the sequences are the respective sequences.

Embodiment 12: The apparatus of any of embodiments 9-10, the one or more ICS are further configured to: select respective seed values for generating the respective sequences, wherein a length of each seed value is at most ½ of a length of the corresponding sequence; transmit the respective seed values to the second communication device; and generate the respective sequences using the respective seed values.

Embodiment 13: The apparatus of embodiment 12, wherein: the network interface device includes a forward error correction (FEC) encoder implemented on the one or more ICS, wherein the FEC encoder is configured to implement an FEC code having a coding rate of at most ½; and the one or more ICs are configured to: provide the seed as an input to the FEC encoder, and use the FEC encoder to generate an output sequence based on the seed.

Embodiment 14: The apparatus of embodiment 12, wherein, in generating the respective sequences using the respective seed values, the one or more ICs are further configured to, for each sequence: provide the seed to a pseudorandom sequence generator circuit of the first communication device, wherein the pseudorandom sequence generator circuit comprises a linear feedback shift register circuit with a sequence of memory elements coupled in series; and generate, using the pseudorandom sequence generator circuit, an output sequence based on the seed.

Embodiment 15: A method, comprising: receiving, at a first communication device, an indication of a sequence corresponding to a training field in a null data packet (NDP) in a range measurement exchange session with a second communication device, wherein the training field corresponds to an orthogonal frequency division multiplexing (OFDM) symbol, wherein the sequence specifies frequency domain values for the OFDM symbol, and wherein the sequence includes complex number values; determining, at the first communication device, a signal corresponding to the training field using the indication of the sequence that specifies the frequency domain values for the OFDM symbol corresponding to the training field; generating, at the first communication device, a cross-correlation between a received signal and the signal corresponding to the training field; detecting, at the first communication device, the training field in the received signal; and using, at the first communication device, the detection of the training field in the received signal to determine a time of arrival at the first communication device of the NDP.

Embodiment 16: The method of embodiment 15, wherein: receiving the indication of the sequence comprises receiving a seed value for generating the sequence, wherein a length of the seed value is at most ½ of a length of the sequence; and the method further comprises generating, at the first communication device, the sequence using the seed value.

Embodiment 17: The method of embodiment 16, wherein generating the sequence using the seed value includes: providing the seed as an input to a forward error correction (FEC) encoder of the first communication device, wherein the FEC encoder implements an FEC code having a coding rate of at most ½; and generating, using the FEC encoder, an output sequence based on the seed.

Embodiment 18: The method of embodiment 16, wherein generating the sequence using the seed value includes: providing the seed to a pseudorandom sequence generator circuit of the first communication device, wherein the pseudorandom sequence generator circuit comprises a linear feedback shift register circuit with a sequence of memory elements coupled in series; and generating, using the pseudorandom sequence generator circuit, an output sequence based on the seed.

Embodiment 19: The method of any of embodiments 15-18, wherein: the NDP includes a plurality of training fields; the training fields corresponds to respective OFDM symbols; and the method further comprises: receiving, at a first communication device, respective indications of respective sequences corresponding to the respective training fields in a null data packet (NDP) in a range measurement exchange session, wherein the respective sequences specify frequency domain values for the respective OFDM symbols, and wherein each sequence includes complex number values; determining, at the first communication device, respective signals corresponding to the respective training fields using the respective indications of the respective sequences; generating, at the first communication device, respective cross-correlations between the received signal and the respective signals corresponding to the respective training fields; detecting, at the first communication device, the respective training fields in the received signal; and using, at the first communication device, the respective detections of the respective training fields in the received signal to determine the time of arrival at the first communication device of the NDP.

Embodiment 20: The method of any of embodiments 15-19, wherein generating the cross-correlation comprises: zero-padding, at the first communication device, a time-domain signal corresponding to a duration of the OFDM symbol and a guard interval to generate a set of time-domain samples corresponding to a duration equal to twice the duration of the OFDM symbol; and using, at the first communication device, the set of set of time-domain samples to generate the cross-correlation.

Embodiment 21: The method of embodiment 20, wherein generating the cross-correlation further comprises: calculating, at the first communication device, a first discrete Fourier transform of the set of time-domain samples corresponding to the duration equal to twice the duration of the OFDM symbol; calculating, at the first communication device, a second discrete Fourier transform of the signal corresponding to the training field zero-padded to a duration equal to twice the duration of the OFDM symbol; and using, at the first communication device, the first discrete Fourier transform and the second discrete Fourier transform to generate the cross-correlation.

Embodiment 22: An apparatus, comprising: a network interface device associated with a first communication device. The network interface device includes one or more integrated circuits (ICS) configured to: receive an indication of a sequence corresponding to a training field in a null data packet (NDP) in a range measurement exchange session with a second communication device, wherein the training field corresponds to an orthogonal frequency division multiplexing (OFDM) symbol, wherein the sequence specifies frequency domain values for the OFDM symbol, and wherein the sequence includes complex number values, determine a signal corresponding to the training field using the indication of the sequence that specifies the frequency domain values for the OFDM symbol corresponding to the training field, generate a cross-correlation between a received signal and the signal corresponding to the training field, detect the training field in the received signal, and use the detection of the training field in the received signal to determine a time of arrival at the first communication device of the NDP.

Embodiment 23: The apparatus of embodiment 22, wherein: the indication of the sequence comprises a seed value for generating the sequence, wherein a length of the seed value is at most ½ of a length of the sequence; and the network interface device includes a generator circuit, implemented on the one or more ICS, that is configured to generate the sequence using the seed value.

Embodiment 24: The apparatus of embodiment 23, wherein the generator circuit comprises a forward error correction (FEC) encoder that implements an FEC code having a coding rate of at most ½; and the one or more ICs are configured to provide the seed to an input of the FEC encoder to generate an output sequence based on the seed.

Embodiment 25: The apparatus of embodiment 23, wherein the generator circuit comprises a pseudorandom sequence generator circuit that includes a linear feedback shift register circuit with a sequence of memory elements coupled in series; and the one or more ICs are configured to provide the seed to an input of the pseudorandom sequence generator circuit to generate an output sequence based on the seed.

Embodiment 26: The apparatus of any of embodiments 22-25, wherein: the NDP includes a plurality of training fields; the training fields corresponds to respective OFDM symbols; and the one or more ICs are configured to: receive respective indications of respective sequences corresponding to the respective training fields in a null data packet (NDP) in a range measurement exchange session, wherein the respective sequences specify frequency domain values for the respective OFDM symbols, and wherein each sequence includes complex number values, determine respective signals corresponding to the respective training fields using the respective indications of the respective sequences, generate respective cross-correlations between the received signal and the respective signals corresponding to the respective training fields, detect the respective training fields in the received signal, and use the respective detections of the respective training fields in the received signal to determine the time of arrival at the first communication device of the NDP.

Embodiment 27: The apparatus of any of embodiments 22-26, wherein: the network interface device includes a zero-padding circuit, implemented on the one or more ICS, configured to zero-pad a time-domain signal corresponding to a duration of the OFDM symbol and a guard interval to generate a set of time-domain samples corresponding to a duration equal to twice the duration of the OFDM symbol; and the one or more ICs are configured to use the set of set of time-domain samples to generate the cross-correlation.

Embodiment 28: The apparatus of embodiment 27, wherein: the network interface device includes a discrete Fourier transform (DFT) calculator configured to: calculate a first DFT of the set of time-domain samples corresponding to the duration equal to twice the duration of the OFDM symbol, and calculate a second DFT of the signal corresponding to the training field zero-padded to a duration equal to twice the duration of the OFDM symbol; and the one or more ICs are further configured to use the first DFT and the second DFT to generate the cross-correlation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
    generating, at a first communication device, a null data packet (NDP) for a range measurement signal exchange session between the first communication device and a second communication device, wherein generating the NDP includes:
        generating a plurality of training fields to be used by the second communication device to determine a time of arrival of the NDP, wherein each training field corresponds to a respective orthogonal frequency divisional multiplexing (OFDM) symbol;
    wherein generating the plurality of training fields includes: i) setting signal samples corresponding to guard intervals between the OFDM symbols to zero, and ii) for each OFDM symbol, setting a plurality of frequency domain values corresponding to OFDM subcarriers of the OFDM symbol to complex number values; and
    transmitting, by the first communication device, the NDP as part of the range measurement signal exchange session.

2. The method of claim 1, further comprising:
    selecting, at the first communication device, respective sequences for the plurality of training fields, wherein the selected sequences respectively specify frequency domain values for the respective OFDM symbols; and
    transmitting, by the first communication device, respective indications of the sequences to the second communication device,
    wherein generating the plurality of training fields further includes generating the OFDM symbols according to the selected sequences.

3. The method of claim 2, wherein the selected sequences are different sequences.

4. The method of claim 2, wherein:
    transmitting the respective indications of the sequences to the second communication device comprises transmitting the respective sequences to the second communication device.

5. The method of claim 2, wherein:
    selecting the respective sequences for the plurality of training fields comprises:
    selecting respective seed values for generating the respective sequences, wherein a length of each seed value is at most ½ of a length of the corresponding sequence;
    transmitting the respective indications of the sequences to the second communication device comprises transmitting the respective seed values; and
    generating the OFDM symbols according to the selected sequences includes generating, at the first communication device, the respective sequences using the respective seed values.

6. The method of claim 5, wherein generating the respective sequences using the respective seed values includes, for each sequence:
    providing the seed as an input to a forward error correction (FEC) encoder of the first communication device, wherein the FEC encoder implements an FEC code having a coding rate of at most ½; and
    generating, using the FEC encoder, an output sequence based on the seed.

7. The method of claim 5, wherein generating the respective sequences using the respective seed values includes, for each sequence:
    providing the seed to a pseudorandom sequence generator circuit of the first communication device, wherein the pseudorandom sequence generator circuit comprises a linear feedback shift register circuit with a sequence of memory elements coupled in series; and
    generating, using the pseudorandom sequence generator circuit, an output sequence based on the seed.

8. An apparatus, comprising:
    a network interface device associated with a first communication device, wherein the network interface device includes one or more integrated circuits (ICs) configured to:
        generate a null data packet (NDP) for a range measurement signal exchange session between the first communication device and a second communication device, wherein generating the NDP includes:
            generating a plurality of training fields to be used by the second communication device to determine a time of arrival of the NDP, wherein each training field corresponds to a respective orthogonal frequency divisional multiplexing (OFDM) symbol,
        wherein the one or more ICs are further configured to: i) set signal samples corresponding to guard intervals between the OFDM symbols to zero, and ii) for each OFDM symbol, set a plurality of frequency domain values corresponding to OFDM subcarriers of the OFDM symbol to complex number values, and wherein the one or more ICs are further configured to transmit the NDP as part of the range measurement signal exchange session.

9. The apparatus of claim 8, wherein the one or more ICs are further configured to:
select respective sequences for the plurality of training fields, wherein the selected sequences respectively specify frequency domain values for the respective OFDM symbols;
transmit respective indications of the sequences to the second communication device; and
generate the OFDM symbols according to the selected sequences.

10. The apparatus of claim 9, wherein the selected sequences are different sequences.

11. The apparatus of claim 9, wherein the respective indications of the sequences are the respective sequences.

12. The apparatus of claim 9, the one or more ICs are further configured to:
select respective seed values for generating the respective sequences, wherein a length of each seed value is at most ½ of a length of the corresponding sequence;
transmit the respective seed values to the second communication device; and
generate the respective sequences using the respective seed values.

13. The apparatus of claim 12, wherein:
the network interface device includes a forward error correction (FEC) encoder implemented on the one or more ICs, wherein the FEC encoder is configured to implement an FEC code having a coding rate of at most ½; and
the one or more ICs are configured to:
provide the seed as an input to the FEC encoder, and use the FEC encoder to generate an output sequence based on the seed.

14. The apparatus of claim 12, wherein, in generating the respective sequences using the respective seed values, the one or more ICs are further configured to, for each sequence:
provide the seed to a pseudorandom sequence generator circuit of the first communication device, wherein the pseudorandom sequence generator circuit comprises a linear feedback shift register circuit with a sequence of memory elements coupled in series; and
generate, using the pseudorandom sequence generator circuit, an output sequence based on the seed.

15. A method, comprising:
receiving, at a first communication device, an indication of a sequence corresponding to a training field in a null data packet (NDP) in a range measurement exchange session with a second communication device, wherein the training field corresponds to an orthogonal frequency division multiplexing (OFDM) symbol, wherein the sequence specifies frequency domain values for the OFDM symbol, and wherein the sequence includes complex number values;
determining, at the first communication device, a signal corresponding to the training field using the indication of the sequence that specifies the frequency domain values for the OFDM symbol corresponding to the training field;
generating, at the first communication device, a cross-correlation between a received signal and the signal corresponding to the training field;
detecting, at the first communication device, the training field in the received signal; and
using, at the first communication device, the detection of the training field in the received signal to determine a time of arrival at the first communication device of the NDP.

16. The method of claim 15, wherein:
receiving the indication of the sequence comprises receiving a seed value for generating the sequence, wherein a length of the seed value is at most ½ of a length of the sequence; and
the method further comprises generating, at the first communication device, the sequence using the seed value.

17. The method of claim 16, wherein generating the sequence using the seed value includes:
providing the seed as an input to a forward error correction (FEC) encoder of the first communication device, wherein the FEC encoder implements an FEC code having a coding rate of at most ½; and
generating, using the FEC encoder, an output sequence based on the seed.

18. The method of claim 16, wherein generating the sequence using the seed value includes:
providing the seed to a pseudorandom sequence generator circuit of the first communication device, wherein the pseudorandom sequence generator circuit comprises a linear feedback shift register circuit with a sequence of memory elements coupled in series; and
generating, using the pseudorandom sequence generator circuit, an output sequence based on the seed.

19. The method of claim 15, wherein:
the NDP includes a plurality of training fields;
the training fields corresponds to respective OFDM symbols; and
the method further comprises:
receiving, at a first communication device, respective indications of respective sequences corresponding to the respective training fields in a null data packet (NDP) in a range measurement exchange session, wherein the respective sequences specify frequency domain values for the respective OFDM symbols, and wherein each sequence includes complex number values;
determining, at the first communication device, respective signals corresponding to the respective training fields using the respective indications of the respective sequences;
generating, at the first communication device, respective cross-correlations between the received signal and the respective signals corresponding to the respective training fields;
detecting, at the first communication device, the respective training fields in the received signal; and
using, at the first communication device, the respective detections of the respective training fields in the received signal to determine the time of arrival at the first communication device of the NDP.

20. The method of claim 15, wherein generating the cross-correlation comprises:
zero-padding, at the first communication device, a time-domain signal corresponding to a duration of the OFDM symbol and a guard interval to generate a set of time-domain samples corresponding to a duration equal to twice the duration of the OFDM symbol; and
using, at the first communication device, the set of set of time-domain samples to generate the cross-correlation.

21. The method of claim 20, wherein generating the cross-correlation further comprises:

calculating, at the first communication device, a first discrete Fourier transform of the set of time-domain samples corresponding to the duration equal to twice the duration of the OFDM symbol;

calculating, at the first communication device, a second discrete Fourier transform of the signal corresponding to the training field zero-padded to a duration equal to twice the duration of the OFDM symbol; and using, at the first communication device, the first discrete Fourier transform and the second discrete Fourier transform to generate the cross-correlation.

22. An apparatus, comprising:

a network interface device associated with a first communication device, wherein the network interface device includes one or more integrated circuits (ICs) configured to:

receive an indication of a sequence corresponding to a training field in a null data packet (NDP) in a range measurement exchange session with a second communication device, wherein the training field corresponds to an orthogonal frequency division multiplexing (OFDM) symbol, wherein the sequence specifies frequency domain values for the OFDM symbol, and wherein the sequence includes complex number values, determine a signal corresponding to the training field using the indication of the sequence that specifies the frequency domain values for the OFDM symbol corresponding to the training field, generate a cross-correlation between a received signal and the signal corresponding to the training field, detect the training field in the received signal, and use the detection of the training field in the received signal to determine a time of arrival at the first communication device of the NDP.

23. The apparatus of claim 22, wherein:

the indication of the sequence comprises a seed value for generating the sequence, wherein a length of the seed value is at most ½ of a length of the sequence; and the network interface device includes a generator circuit, implemented on the one or more ICs, that is configured to generate the sequence using the seed value.

24. The apparatus of claim 23, wherein the generator circuit comprises a forward error correction (FEC) encoder that implements an FEC code having a coding rate of at most ½; and the one or more ICs are configured to provide the seed to an input of the FEC encoder to generate an output sequence based on the seed.

25. The apparatus of claim 23, wherein the generator circuit comprises a pseudorandom sequence generator circuit that includes a linear feedback shift register circuit with a sequence of memory elements coupled in series; and the one or more ICs are configured to provide the seed to an input of the pseudorandom sequence generator circuit to generate an output sequence based on the seed.

26. The apparatus of claim 22, wherein:

the NDP includes a plurality of training fields;

the training fields corresponds to respective OFDM symbols; and the one or more ICs are configured to:

receive respective indications of respective sequences corresponding to the respective training fields in a null data packet (NDP) in a range measurement exchange session, wherein the respective sequences specify frequency domain values for the respective OFDM symbols, and wherein each sequence includes complex number values, determine respective signals corresponding to the respective training fields using the respective indications of the respective sequences, generate respective cross-correlations between the received signal and the respective signals corresponding to the respective training fields, detect the respective training fields in the received signal, and use the respective detections of the respective training fields in the received signal to determine the time of arrival at the first communication device of the NDP.

27. The apparatus of claim 22, wherein:

the network interface device includes a zero-padding circuit, implemented on the one or more ICs, configured to zero-pad a time-domain signal corresponding to a duration of the OFDM symbol and a guard interval to generate a set of time-domain samples corresponding to a duration equal to twice the duration of the OFDM symbol; and the one or more ICs are configured to use the set of set of time-domain samples to generate the cross-correlation.

28. The apparatus of claim 27, wherein:

the network interface device includes a discrete Fourier transform (DFT) calculator configured to:

calculate a first DFT of the set of time-domain samples corresponding to the duration equal to twice the duration of the OFDM symbol, and calculate a second DFT of the signal corresponding to the training field zero-padded to a duration equal to twice the duration of the OFDM symbol; and the one or more ICs are further configured to use the first DFT and the second DFT to generate the cross-correlation.

* * * * *